(12) United States Patent
Yeivin et al.

(10) Patent No.: US 6,473,808 B1
(45) Date of Patent: Oct. 29, 2002

(54) HIGH PERFORMANCE COMMUNICATION CONTROLLER FOR PROCESSING HIGH SPEED DATA STREAMS WHEREIN EXECUTION OF A TASK CAN BE SKIPPED IF IT INVOLVES FETCHING INFORMATION FROM EXTERNAL MEMORY BANK

(75) Inventors: Yoram Yeivin, Hod Hasharon (IL); Eliezer Weitz, Holon (IL); Moti Kurnick, Tel Aviv (IL); Avi Shalev, Tel Aviv (IL); Avi Hagai, Herzlia (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/285,519

(22) Filed: Apr. 2, 1999

(51) Int. Cl.[7] .............................. G06F 3/00; G06F 9/48
(52) U.S. Cl. ............................ 710/6; 710/27; 710/240; 709/102; 709/107
(58) Field of Search ................................ 710/6, 22, 27, 710/240, 244, 264; 709/100, 102, 103, 107, 223; 711/5, 100

(56) References Cited

U.S. PATENT DOCUMENTS 4,980,820 A * 12/1990 Youngblood ................. 710/48
5,193,071 A * 3/1993 Umina et al. .......... 365/189.01
5,666,545 A * 9/1997 Marshall et al. ............. 709/107

OTHER PUBLICATIONS

Motorola Microprocessor and Memory Technologies Group, Errata and Added Information to MC68360 Quad Integrated Communication Controller User's Manual Rev. 1, Nov. 1, 1995, Rev. 3.0, by Motorola.

* cited by examiner

Primary Examiner—Thomas Lee
Assistant Examiner—Thuan Du

(57) ABSTRACT

A communication controller for handling high speed multi protocol data streams, wherein a stream is comprised of frames. Communication controller has two processors, second processor initializes first processor and handles high level management and protocol functions, first processor handles the data stream transactions. First processor and second processors are coupled to a two external buses. First processor handles a transactions of a frame by executing a task. First processor performs a task switch when there is a need to fetch information from an external unit, coupled to either first or second external bus, if it did process a whole frame, or if there is a need to fetch a portion of a frame from a communication channel.

20 Claims, 11 Drawing Sheets

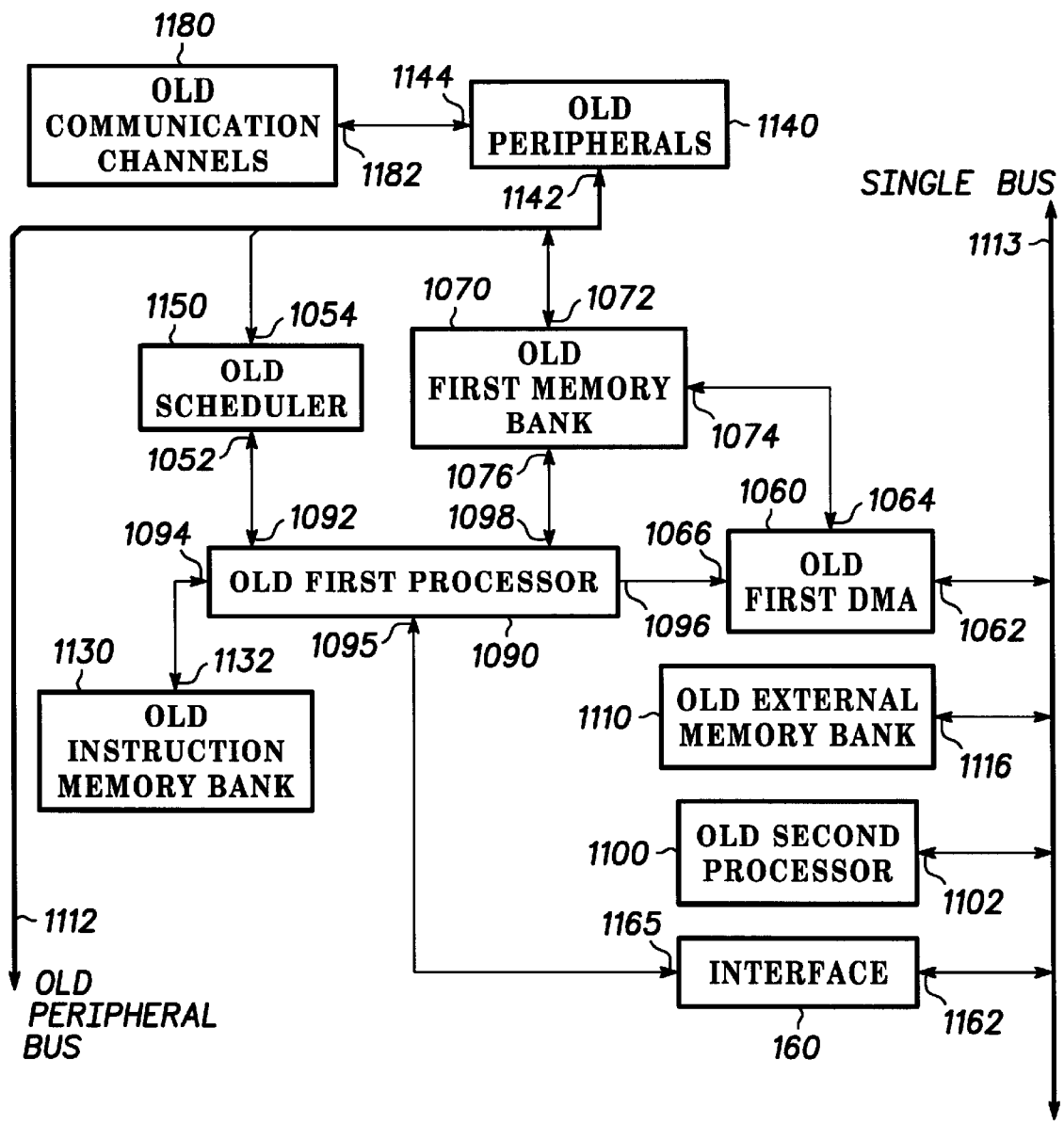
- *PRIOR ART* - FIG. 1

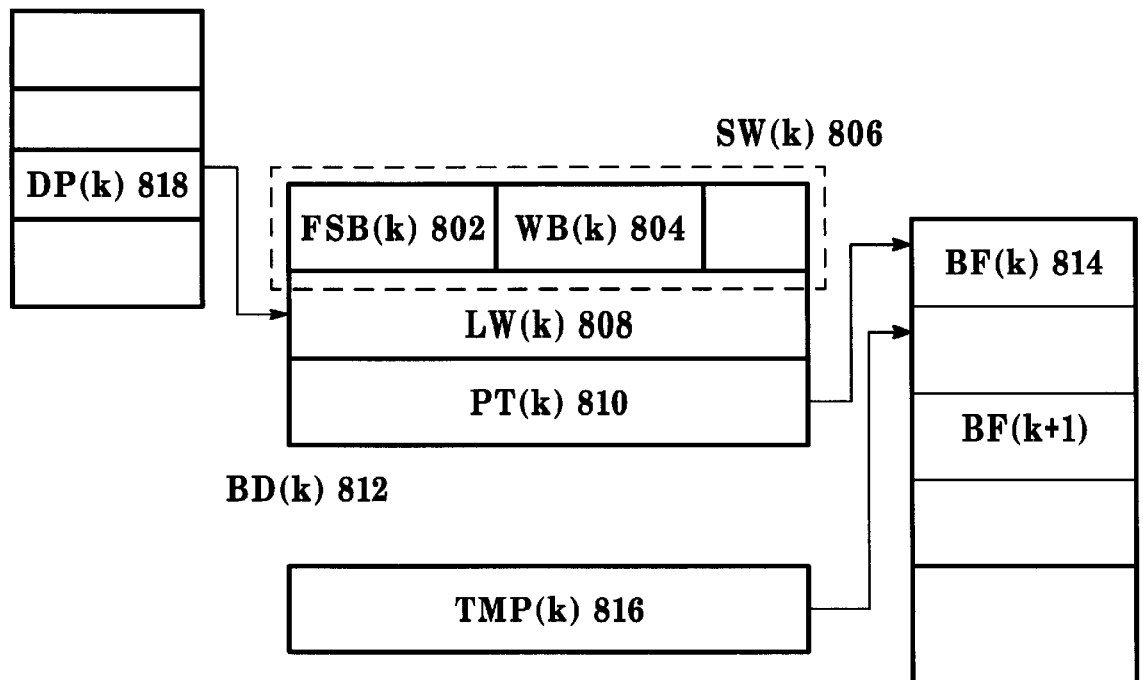
FIG. 2 - PRIOR ART -
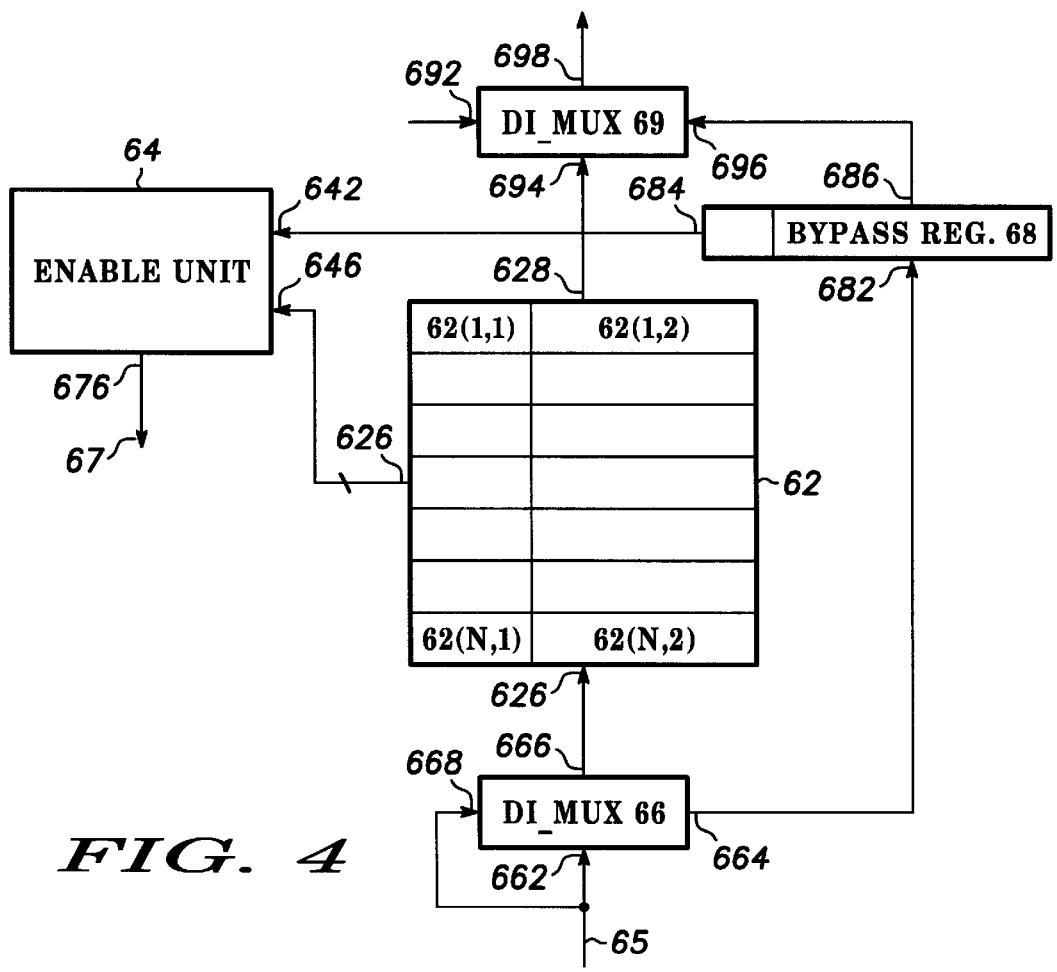
FIG. 4

HIGH PERFORMANCE COMMUNICATION CONTROLLER FOR PROCESSING HIGH SPEED DATA STREAMS WHEREIN EXECUTION OF A TASK CAN BE SKIPPED IF IT INVOLVES FETCHING INFORMATION FROM EXTERNAL MEMORY BANK

FIELD OF THE INVENTION

The present invention relates generally to communication controllers, and more particularly to high performance communication controllers.

BACKGROUND OF THE INVENTION

Communication controllers are usually found in networking and telecommunication products. Communication controllers process data streams according to a variety of multi-layered communication protocols, and transform a data packets associated with one communication layer to a data packet associated with another communication layer.

When a communication processor handles data streams associated with a variety of communication protocols, the communication controller handles each communication protocol in a separate mode, and skips between the various modes.

Communication controllers need to handle high speed data streams. Communication controllers further need to handle data streams according to a variety of multi layered communication protocols. In order to handle high speed data streams, communication controllers need to have a very large bandwidth, such as hundreds of MIPS, and even more. In order to receive, transmit and process data according to variety of communication protocols, especially in a very fast manner, communication controller need to skip very quickly between its various modes.

FIG. 1 is a simplified schematic description of old communication channels 1180, old external memory bank 1100 and old communication controller 101 according to the prior art. Old communication controller 101 is analogues to Motorola's MC68360 chip. Old communication controller 101 comprises of: an old scheduler 1050, an old first direct memory access controller (i.e.—old first DMA) 1060, old first memory bank 1070, old first processor 1090, old instruction memory bank 1130, old second processor 1100 and old interface 1160. Old communication controller 101 is coupled to an old external memory bank 1110. Old communication controller 101 can also be coupled to other external units, such as but not limited to another external memory bank, a host system and other processors. Old communication controller 101 can be coupled to a plurality of external memory banks. For convenience of explanation, the plurality of memory banks is referred to as old external memory 1110.

Old scheduler 1050 has inputs 1054 and 1056 and inputs/outputs (i.e.—I/O's) 1052. Old first DMA 1060 has input 1066, output 1068 and I/O's 1062 and 1064. Old first memory bank 1070 has I/O's 1072, 1074 and 1076. Old first processor 1090 has input 1095, output 1096 and I/O's 1092, 1094 and 1098. Old second processor 1100 has I/O 1102. Old external memory bank 1110 has I/O 1116. Old interface 1060 has I/O's 1162 and 1165.

N old peripherals PR(1)–PR(N) 1141–1148, collectively denoted as 1140, are coupled to old peripheral bus 1112. Preferably, N old peripherals 1140 are placed within old communication controller 101. N peripherals 1140 couple old communication controller 101 to multiple old communication channels CC(1)–CC(K) 1181–1188, collectively denoted as 1180. Old communication channels 1180 have I/O's collectively denoted 1182. Old peripherals have I/O's collectively denoted 1144. I/O's 1182 are coupled to I/O's 1144.

I/O 1142 of old peripherals 1140, I/O 1072 of old first memory bank 1070 and input 1054 of old scheduler 1150 are coupled to old peripheral bus 1112. I/O 1062 of old first DMA 1060, I/O 1116 of old external memory bank 1116, I/O 1102 of old second processor 1110, and I/O 1162 of old interface 1160 are coupled to single bus 1113. Single bus 1113 is an external bus which couples old communication controller 101 to various external units. I/O 1052 of old scheduler 1050 is coupled to I/O 1092 of old first processor 1090. I/O 1094 of old first processor 1090 is coupled to I/O 1132 of old instruction memory bank 1130. I/O 1095 of old first processor 90 is coupled to I/O 1165 of old interface 1160. I/O 1098 of old first processor 90 is coupled to I/O 1076 of old first memory bank 1070. Output 1096 of old first processor 90 is coupled to input 1066 of old first DMA 100. I/O 1064 of old first DMA 1060 is coupled to I/O 1074 of old first memory 1070.

Old interface 1060 is a set of registers which can be accessed by old first processor 1090, and by any unit which has access to single bus 1113.

An old peripheral is usually tailored to handle one or more communication protocol. Some old peripherals can be coupled to a single communication channel and some can be coupled to multiple communication channels. One of the peripherals is a Serial Communication Controller (i.e.—SCC), which deals with various communication protocols such as IEEE 802.3/Ethernet, High-Level/Synchronous Data Link Control (i.e.—HDLC/SDLC), Universal Asynchronous Receiver Transmitter (i.e.—UART). Another peripheral is a Serial Management Controller (i.e.—SMC), which deals with UART and provide totally transparent functionality. Another peripheral is a Serial Peripheral Interface (i.e.—SPI) which allows old communication controller 101 to exchange data with other communication controllers and with a number of peripheral devices such as ISDN devices and Analog to Digital converters. The peripherals which deal with serial communication protocols usually are comprised from parallel to serial converters, such as shift register, which receive from a communication channel a serial data bit stream, and convert the bit stream into a set of multiple bit words, to be sent to old first processor 1090. These peripherals also comprise of parallel to serial converters, such as shift registers, for receiving a multiple bit words from old first processor 1090 and converting each word to a stream of single bits. Conveniently, each old peripheral is a state machine.

Old communication processor 101 could processes data according to a large 20 variety communication protocols. Old communication controller 101 has an old first processor 1090 which can handle a variety of communication protocols, according to programmable routines which can be stored in old instruction memory bank 1130, old first memory bank 1070 or any other memory bank. When processing data, old first processor 1090 uses a set of parameters (request channel parameters, communication channel parameters) which are stored in old first memory bank 1070 or in old external memory bank 1110. Conveniently, the parameters are a part of each communication protocol (i.e.—protocol). Usually, the parameters are well known in the art. For example, the Ethernet protocol specific parameters were published at pages 7-247–7-248 of Motorola's MC68360 user's manual, the UART protocol specific parameters were published at page 7-145, the HDLC protocol specific parameters were published at page 7-173, the BISYNC protocol specific parameters were published at page 7-203, and the Transparent protocol specific parameters were published at page. 7-225. There are various types of parameters, such as request channel parameters which define the status of a request channel, and communication channel parameters which define the status of a single communication channel. For example, request channel parameters of a request channel analogues to the SCC were published at page 7-125 of Motorola's MC68260 user's manual, and the communication channel parameters of various communication protocols were published at pages 7-145, 7-173, 7-203, 7-225 and 7-247–7-248 of Motorola's user's manual.

Old second processor 1100 initializes old first processor 1090 and handles high level management and protocol functions, such as byte-swapping, encapsulation and routing. Old first processor 1090 controls all data stream transactions. Old first processor 1090 handles a transaction, after old scheduler 1150 receives a request to handle such a transaction and notifies old first processor of a need to handle a transaction. If there are more than a single request, from some old peripherals, old scheduler 1050 selects the highest priority request.

A "task" is defined as the set of instruction which are executed by old first processor 1090 for controlling a single transaction of a data frame. Usually a transaction of data is initiated by a receive request or a transmit request from one of the peripherals. Conveniently, FIG. 2 is a schematic description of a portion of old first memory bank and a portion of old external memory bank.

A data frame associated with a communication channel is stored in a buffer BF(k) 814, the size of buffer BF(k) 814 can be programmed. A data frame (as defined in each communication protocol) is stored in one or more buffers, and a single buffer does not store data from more than one data frame. At least one data frame is associated with a single communication channel. The set of buffers which stores data associated to a single communication channel form a circular queue. Most of the buffers are located in old external memory bank 1110. Buffer BF(k) 814 is referenced by buffer descriptor BD(k) 812, buffer descriptors are collectively denoted 288. Most buffer descriptor are stored within old first memory bank 1070 and some are stored in old external memory bank 1110.

Conveniently, buffer descriptor BD(k) 812 comprises of a pointer field (i.e.—PT(k)) 810, a status and control field (i.e.—SW(k)) 806 and a length field (i.e.—LW(k)) 808. The beginning of buffer BF(k) 814 is referenced by PT(k) 810. LW(k) 808 determines the length of buffer BF(k) 814. SW(k) 806 comprises of a F/S bit FSB(k) 802 which determines which of old first and old second processors 1090 and 1100 can process and/or access buffer BF(k) 812. Old first processor 1090 sets FSB(k) when it finished to transmit all the data stored in BF(k) 812, or when it finished to receive a data frame, or when a received data filled BF(k) 812. Old second processor 1100 resets FSB(k) 802 when it filled BF(k) 814 with data to be transmitted to a communication channel or when it finished to read the data stored within BK(k) 814, wherein the data was received from a communication channel. SW(k) 806 also comprises of a wrap field (i.e.—WB(k)) 804, which indicated whether BD(k) 814 is the last buffer descriptor relating to a communication channel. PT(k) 810 points to the beginning of BF(k) 814. Because a buffer comprises of a plurality of memory words, a temporary counter TMP(k) 816 points to an address in which a new data word, received from CC(k), is stored or in which a data word to be transmitted to CC(k) is stored. After the data word is stored/transmitted TMP(k) 816 is updated.

Each buffer descriptor BD(k) 814 is referenced by an descriptor pointer DP(k) 818. Descriptor pointers are stored within old first memory bank 1070.

Old first processor 1090 does not fetch a new buffer descriptor BD(k+1), and does not process data stored within the buffer BF(k+1), associated with this buffer descriptor, until it finishes to process buffer BF(k) 814.

The transmission and reception of data involves fetching request channel parameters, communication channel parameters, TMP(k) 816, DP(k) 818, BD(k) 812 and data stored within BF(k) 814 (i.e.—information). If there is an need to fetch information from external memory, old first processor 1090 activates old first DMA 1060 and waits until the information is fetched. After the information is fetched, the old first processor 1090 continues to perform the task which involved fetching information from old external memory 1100.

Old first processor 1090 and old second processor 1010 share a single external but, thus limiting the frequency and the available bandwidth of old communication controller 101.

Old first processor 1090 was idle while time consuming operations such as fetching information from external memory ended, thus reducing its frequency.

Old communication controller 101, does not have the required bandwidth, could not skip between tasks and couldn't handle high speed data streams, especially high speed data streams associated with a variety of communication protocols.

There is a need of an improved high performance communication controller that can handle high speed data streams, and especially high speed data streams associated with a variety of communication protocols.

BRIEF DESCRIPTION OF THE DRAWINGS

While the invention is pointed out with particularity in the appended claims, other features of the invention are disclosed by the following detailed description taken in conjunction with the accompanying drawings, in which:

FIG 1 is a simplified schematic description of old communication channels, old external memory and an old communication controller, according to the prior art;

FIG. 2 is a schematic description of a portion of old first memory bank and a portion of old external memory bank, according to the prior art;

FIG. 4 is a schematic description of a control section of a first direct memory access controller according to a preferred embodiment of the invention;

DETAILED DESCRIPTION OF THE DRAWINGS

Generally, an aspect of the invention is the ability to handle high speed data streams, and especially high speed data streams associated with a variety of communication protocols.

It should be noted that the particular terms and expressions employed and the particular structural and operational detail disclosed in the detailed description and accompanying drawings are for illustrative purposes only and are not intended to in any way limit the scope of the invention as described in the appended claims.

Figure 3:
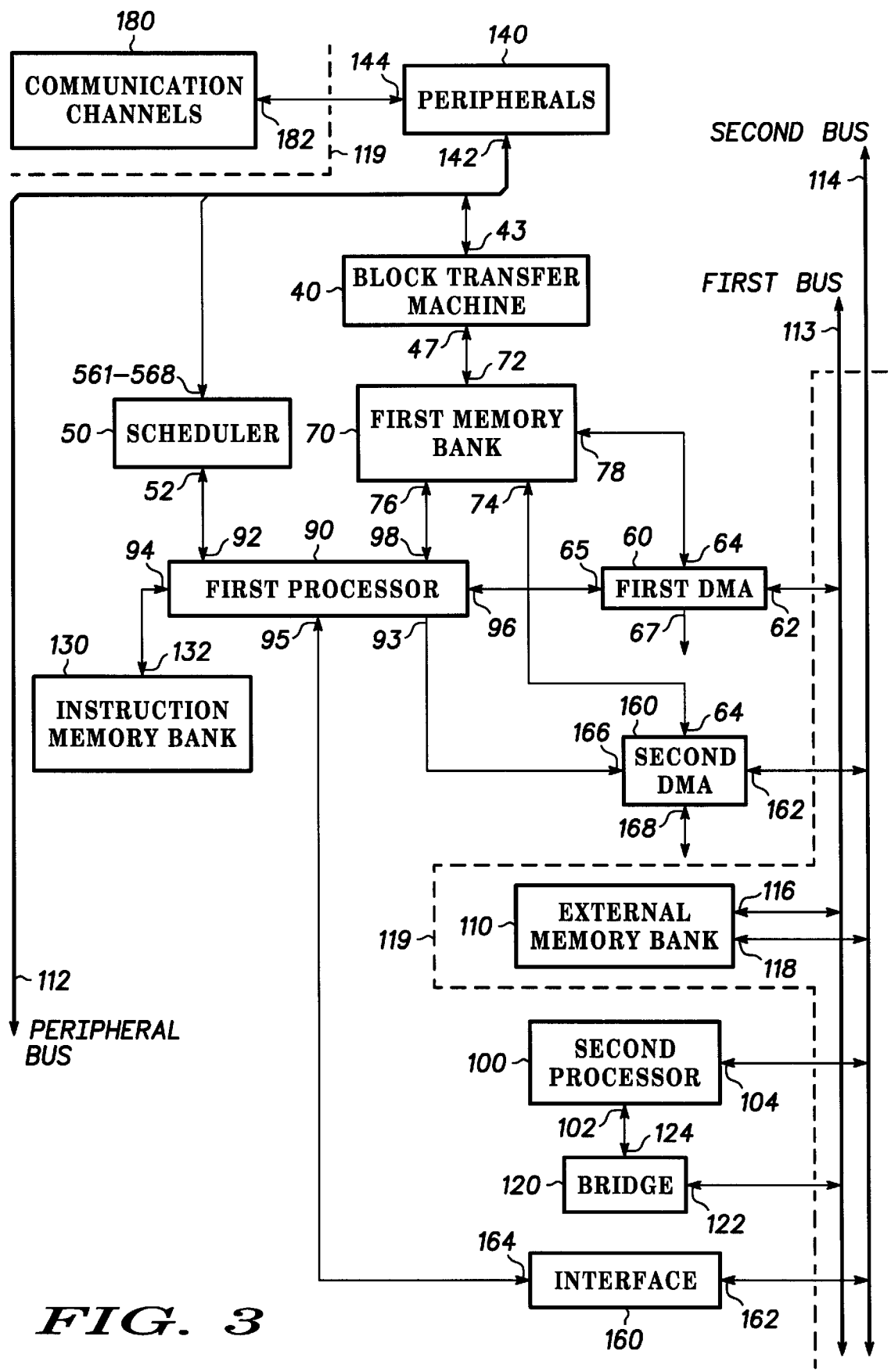
FIG. 3 is a schematic description of communication channels, external memory bank and a communication controller, according to a preferred embodiment of the invention.

FIG. 3 is a schematic description of a communication channels 180, external memory bank 110 and a communication controller 111, according to a preferred embodiment of the invention. As indicated by dashed line 119, communication controller 111 comprises of: scheduler 50, first DMA 60, second DMA 160, first memory bank 70, first processor 90, instruction memory bank 130, second processor 100 and multiple peripherals, collectively denoted 140. Communication controller 111 is coupled to two external buses—first bus 113 and second bus 114. Communication controller is also coupled to external memory bank 110 and to multiple communication channels, collectively denoted 180. Conveniently, multiple communication channels 180 are coupled to multiple peripherals 140. Communication controller 111 can also be coupled to other external units, such as but not limited to another external memory bank, a host system and other processors. Communication controller can also comprises of bridge 120, interface 160 and block transfer machine (i.e.—BTM) 40. Communication controller 111 can be coupled to a plurality of external memory banks. For convenience of explanation, the plurality of memory banks is referred to as external memory bank 110.

Figure 8:
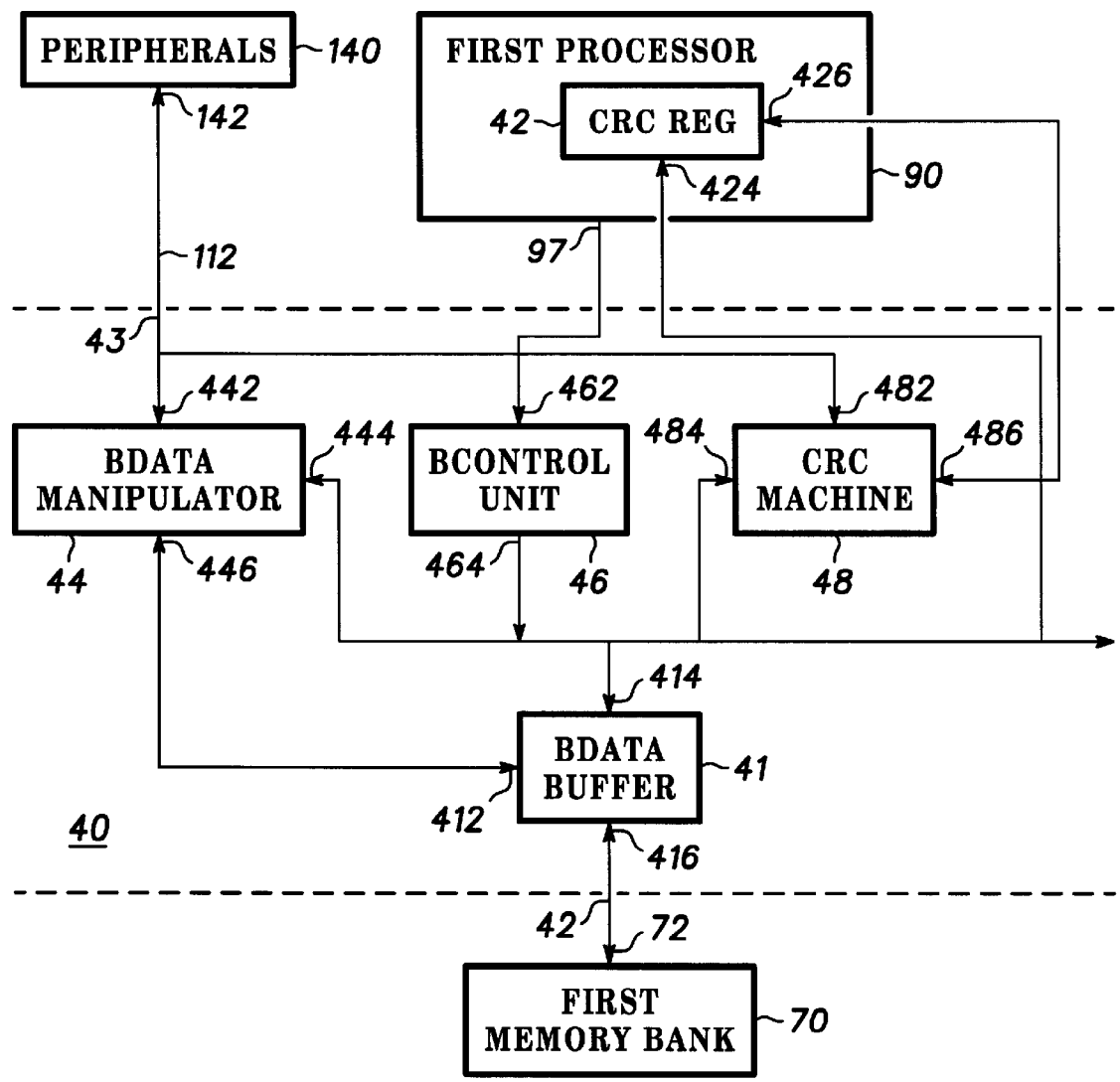
FIG. 8 is a schematic description of a Block Transfer Machine, according to a preferred embodiment of the invention.

Scheduler 50 has inputs 561–568 and I/O 52. First DMA 60 has output 67 and I/O's 62, 64 and 65. Second DMA 160 is analogues to first DMA 60, and has output 167 and I/O's 162, 164 and 165. First memory bank has I/O's 72, 74, 76 and 78. First processor 90 has I/O's 92, 93, 94, 95, 96, 97 and 98 (for convenience of explanation I/O 97 is shown in FIG. 8). Second processor 100 I/O's 102 and 104. External memory bank 110 has I/O's 116 and 118. Instruction memory bank 130 has I/O 132. BTM 40 has I/O's 43, 45 and 47 (for convenience of explanation I/O 46 is shown in FIG. 8). Bridge 120 has I/O's 124 and 122. Interface 160 has I/O's 162 and 164. M peripherals PR(1)–PR(M) 1401–1408, collectively denoted as 140, have M I/O's collectively denoted 144, and M I/O's collectively denoted 142. Preferably, M peripherals 140 are placed within communication controller 111. Multiple (M) peripherals 140 couple communication controller 111 to multiple (K) communication channels CC(1)–CC(K) 1801–1808, collectively denoted as 180, via I/O 144 and 182. I/O's 142 of peripherals 140, I/O 43 of BTM 40 and inputs 561–568 of scheduler 50 are coupled to peripheral bus 112. I/O 162 of second DMA 160, I/O 118 of external memory bank 110, I/O 104 of second processor 110 and I/O 162 of bridge are coupled to second bus 114. I/O 62 of first DMA 60, I/O 116 of external memory bank 110 and I/O 122 of bridge 120 are coupled to first bus 113. I/O 72 of first memory bank 70 is coupled to I/O 45 of BTM 40. I/O 74 of first memory bank 70 is coupled to I/O 164 of second DMA 160. I/O 78 of first memory bank 70 is coupled to I/O 64 of first DMA 60. I/O 76 of first memory bank 70 is coupled to I/O 98 of first processor 90. I/O 93 of first processor 90 is coupled to I/O 165 of second DMA 160. I/O 96 of first processor 90 is coupled to I/O 65 of first DMA 60. I/O 94 of first processor 90 is coupled to I/O 132 of instruction memory bank 130. I/O 95 of first processor 90 is coupled to I/O 164 of interface 160. I/O 92 of first processor 90 is coupled to I/O 52 of scheduler 50. I/O 102 of second processor 100 is coupled to I/O 124 of bridge 120. I/O 167 of second DMA 160 and I/O 67 of first DMA 60 are coupled, via a masking logic (shown on FIG. 6) to inputs 561–568 of scheduler.

Bridge 120 is used for interfacing second processor 100 to first bus 113. Interface 160 comprises of a register and is used to couple first processor 90 to various units, such as second processor 100, via first bus 100. Interface 160 can be used to write instructions to first processor 90.

Some peripherals out of peripherals 140 are comprised of a buffer or a queue that is coupled to one or more communication channels out of communication channels 180. Conveniently, a peripheral is more complicated and usually each peripheral is tailored to handle one or more communication protocol. Some peripherals can be coupled to a single communication channel and some can be coupled to multiple communication channels. For example, and without limiting the scope of the invention, a peripheral which handles HDLC protocols can be coupled to 256 communication channels.

For example, and without limiting the scope of the invention, one peripheral is analogues to Motorola's MC68360 SCC, but can also handle Asynchronous Transfer Mode communication protocol. Another peripheral is analogues to Motorola's MC68360 SMC. Another peripheral is analogues to Motorola's MC68360 SPI. Another peripheral allows communication controller 111 to handle ATM protocols, and another peripheral allows communication controller 111 to handle Fast Ethernet protocol. Peripherals which deal with serial communication protocols usually are comprised from parallel to serial converters, such as shift register, which receive from a communication channel a serial data bit stream, and convert the bit stream into a set of multiple bit words, to be sent to the first processor 90. These peripherals further comprise of parallel to serial converters, such as shift registers, for receiving a multiple bit words from the first processor 90 and converting each word to a stream of single bits. Conveniently, each peripheral comprises of a state machine which is tailored to at least one communication protocol. The state machine converts raw data bit stream to a bit stream compatible to a communication protocol.

Communication processor 111 processes data according to a large variety communication protocols. Communication controller 111 has a first processor 90 which can handle a variety of communication protocols, according to programmable routines which can be stored in instruction memory bank 130, first memory bank 70 or any other memory bank. When processing data, first processor 90 uses a set of parameters (request channel parameters, communication channel parameters) which are stored in first memory bank 70 or in external memory bank 110. Conveniently, the parameters are a part of each communication protocol (i.e.—protocol). Usually, the parameters are well known in the art. For example, and without limiting the scope of the invention, the Ethernet protocol specific parameters were published at pages 7-247 7-248 of Motorola's MC68360 user's manual, the UART protocol specific parameters were published at page 7-145, the HDLC protocol specific parameters were published at page 7-173, the BISYNC protocol specific parameters were published at page 7-203, and the Transparent protocol specific parameters were published at pg. 7-225. There are various types of parameters, such as request channel parameters which define the status of a request channel, and communication channel parameters which define the status of a single communication channel. For example, request channel parameters of a request channel analogues to the SCC were published at page 7-125 of Motorola's MC68260 user's manual, and the communication channel parameters of various communication protocols were published at pages 7-145, 7-173, 7-203, 7-225 and 7-247–7-248 of Motorola's user's manual.

Second processor 100 initializes first processor 90 and handles high level management and protocol functions, such as byte-swapping, encapsulation and routing. Conveniently, second processor is analogues to the CPU32+ of the Motorola MC68360 chip (published in Motorola's MC68360 chip Users Manual). First processor 90 controls data stream transactions.

A "task" is defined as the set of instruction which are executed by first processor 90 for controlling a transaction of a frame. Usually a transaction of a frame is initiated by a receive request or a transmit request from one of the peripherals.

Conveniently, a peripheral can either receive data, or transmit data. For convenience of explanation, each peripheral 140 is regarded as being comprised of two request channels—a transmit request channel, for transmitting data and sending transmit requests and a receive request channel, for receiving data and sending receive requests. For convenience of explanation, the z'th request channel is denoted as RC(z), z 555 being an index having values of 1 to 2M. Z 555 indicates that the z'th request channel has sent a receive or transmit request.

Conveniently, the data processed by communication controller 111 is stored within external memory bank 110, and the process involves the usage of buffers BF(k), buffer descriptors BD(k), descriptor pointers DP(k), pointer fields PT(k), temporary pointers TMP(k), status and control field SCW(k), length fields LW(k), F/S bits FSB(k) which determines which of first and second processors 90 and 100 can process and/or access buffer BF(k). These BF(k), BD(k), DP(k), PT(k), TMP(k), SCW(k), LW(k) and FSB(k) are analogues to buffers BF(k), buffer descriptors BD(k), descriptor pointers DP(k), pointer fields PT(k), status and control field SCW(k), wrap field WB(k), length fields LW(k), and F/S bits FSB(k) of old communication processor 101. First processor 90 sets FSB(k) when it finished to transmit all the data stored in BF(k), or when it finished to receive a data frame, or when a received data filled BF(k). Second processor 100 resets FSB(k) when it filled BF(k) with data to be transmitted to a communication channel or when it finished to read the data stored within BK(k), wherein the data was received from a communication channel. PT(k) points to the beginning of BF(k).

After the data word is stored/transmitted TMP(k) is updated. An updated TMP(k) is sent to/from first memory bank 70 when first processor 90 executes a task switch/starts to perform a task, accordingly.

First processor 90 usually does not fetch a new buffer descriptor BD(k+1), and processes data stored within the buffer BF(k+1) associated with this buffer descriptor, until it finishes to process the whole current buffer BF(k).

Figure 10:
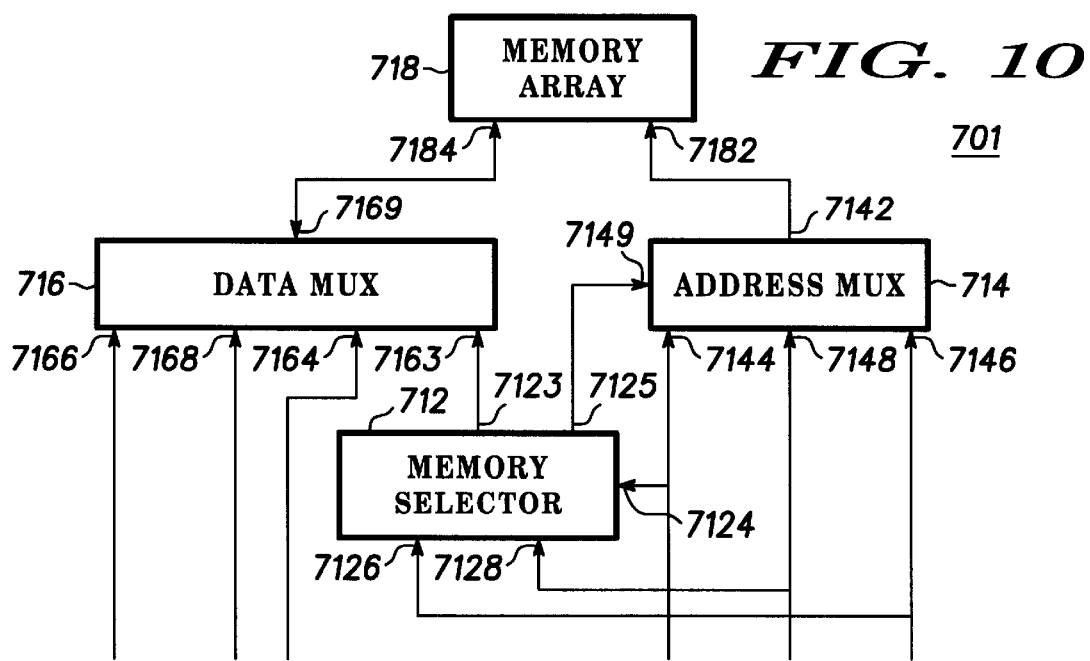
FIG. 10 is a schematic description of one of the memory banks within a first memory bank, according to preferred embodiment of the invention.

As explained in further details with regard to FIG. 10, transmitting or receiving data involves fetching request channel parameters, communication channel parameters, TMP(k), DP(k), BD(k) and data stored within BF(k). If there is an need to perform a DMA operation, during any of the mentioned above fetches, first processor 90 activated first DMA 60, if the DMA request requires access to first bus 113, or second DMA 160, if the DMA request requires access to second bus 114.

FIG. 4 is a schematic description of the control section of first DMA 60 according to a preferred embodiment of the invention. The control section of first DMA 60 is analogues to the control section of second DMA 160. Conveniently, control section of first DMA 60 comprises of a DMA request queue (i.e.—queue) 62, and an enable unit 64. As explained later in further details, queue 62 can store a plurality of DMA request and enable unit 64. Enable unit 64 masks transmit requests or receive requests which are sent from request channels to scheduler 50. Preferably, control section of first DMA 60 comprises of a queue 62, an enable unit 64, a request bypass register (i.e.—bypass reg) 68, an enable unit 64, an input multiplexer (i.e.—Attorney DI_MUX) 66, an output multiplexer (i.e.—DO_MUX) 69. DI_MUX 66 has input 662 and 668, output 666. Queue 62 has input 626, output 628 and a plurality of N outputs collectively denoted as 624. Bypass reg 68 has input 682 and outputs 684 and 686. DO_MUX 69 has inputs 692, 694 and 696 and output 698. Enable unit 64 has got a plurality of N inputs denoted as 646, input 642 and 2M bit output 676, coupled to output 67 of first DMA 60. Inputs 662 and 668 of DI_MUX 66 are coupled to input 65 of first DMA 60.

Queue 62 has N memory words 621–628. Conveniently, each memory word 621–628 has two portions 6211–6281 and 6212–6282. First portions 6211–6281, for storing z 555, which indicates which request channel is associated to the direct access memory request (i.e.—DMA request). Second portions 6212–6282 for storing the DMA requests. DMA 60 moves and/or copies a block of information, from a first location in memory to a second location in memory. Conveniently, a DMA request contains a source, a destination and the size of the block, being transferred by first DMA 60.

Bypass reg 68 has two portions. First portion 681 for storing z 555 and the second portion 682 for storing a DMA request.

DI_MUX 66 receives, via input 664 a DMA request and z 555. DI_MUX 66 receives, via input 668, a BYQ signal 668' which determines if to write the DMA request and z 555 to bypass reg 68 or to queue 62.

If bypass reg 68 is not empty, DO MUX 69 receives a control signal, via input 692, which causes it to select input 696, and to output the DMA request which is stored in bypass reg 68. Else, DO_MUX 69 selects input 694, and outputs the DMA request which is stored at second portion 6212.

A transmit request initiates a task. A receive request initiates a task. First portions 6211–6281 are coupled, via output 624 of queue 62, to input 646 of Enable unit 64. When first processor 70 sends a DMA request associated to RC(z) to first DMA 60, the transmit or receive requests of RC(z) are disabled. After all the DMA requests relating to RC(z) have been performed, its receive or transmit requests are enabled. Usually, the receive or transmit requests and disabled when the task associated with the request ends.

Enable unit 64 masks the transmit or receive request of the request channels associated with DMA requests which are stored within DMA queue 62. Enable unit 64 can sends an enable signal with the corresponding z 555, via output 648 to scheduler 50. Conveniently, output 648 has 2M bits, a bit for each of the 2M request channels, and enable unit 64 sends a 1bit signal to the z'th bit of its output 648, associated to RC(z).

Figure 5:
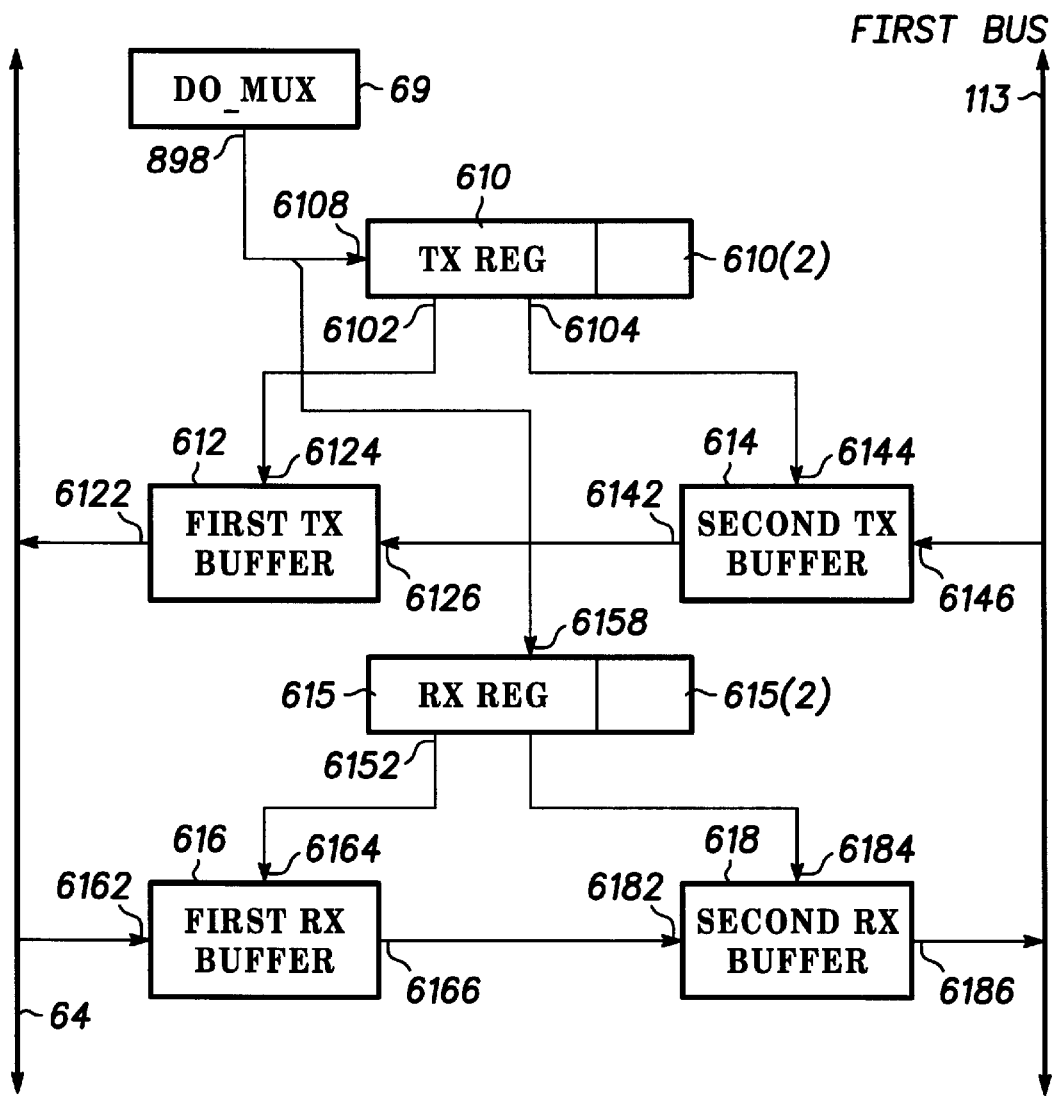
FIG. 5 is a schematic description of a buffering section of a first direct access memory controller, according to a preferred embodiment of the invention.

FIG. 5 is a schematic description of a buffering section of first DMA 60, according to a preferred embodiment of the invention. The buffering section of first DMA 60 is analogues to the buffering section of second DMA 160. Buffering section comprises of first transmit (i.e.—tx) buffer 612, second transmit (i.e.—tx) buffer 614, first receive (i.e.—rx) buffer 616, second receive (i.e.—rx) buffer 618, transmit control unit 610, receive control unit 615.

First tx buffer 612 has input 6126 and 6124 and output 6122. Second tx buffer 614 has inputs 6146 and 6144 and output 6142. Transmit control unit 610 has input 6108 and outputs 6104 and 6102. Receive control unit 615 has input 6158 and outputs 6154 and 6105. First rx buffer 616 has inputs 6162 and 6164 and output 6166. Second rx buffer 618 has inputs 6182 and 6184 and output 6186.

Output 6122 of first tx buffer 612 and input 6162 of first rx buffer 616 are coupled to I/O's 64 and 62 of first DMA 60. Input 6146 of second tx buffer 614 and output 6186 of second rx buffer 618 are coupled to first bus 113. Input 6126 of first tx buffer 612 is coupled to output 6142 of second tx buffer 614. Output 6166 of first rx buffer 616 is coupled to input 6182 of second rx buffer 618. Output 898 of DO_MUX 69 is coupled to inputs 6158 and 6108 of receive control unit 615 and transmit control unit 610 respectively. Output 6102 of transmit control unit 610 is coupled to input 6124 of first tx buffer 612. Output 6152 of receive control unit 615 is coupled to input 6164 of first rx buffer 616. Output 6104 of transmit control unit 610 is coupled to input 6144 of second tx buffer 610. Output 6154 of receive control unit 615 is coupled to input 6184 of second rx buffer 618.

Transmit control unit 610 has a register which stores a DMA instruction, sent from DO_MUX 69, which involves sending data from either I/O 78 of first memory bank 70, I/O 96 of first processor 90, via I/O's 64 and 96 accordingly, to first bus 113. Transmit control unit 610 activates first tx buffer 612 to send data to I/O's 64 or 96, and activates second tx buffer 614 to read data from first bus 113 to second tx buffer 614. Transmit control unit sends control signals to first and second tx buffers 612 and 614 to send data from second tx buffer 614 to first tx buffer 612. Transmit control unit has a field 6102 for storing z 555. Preferably, first and second tx buffer can operative independently.

Receive control unit 615 has a register which stores a DMA instruction, sent from DO_MUX 69, which involves sending data to either I/O 78 of first memory bank 70 or I/O 96 of first processor 90, via I/O's 64 and 96 accordingly, from first bus 113. Receive control unit 615 activates first rx buffer 616 to send data from I/O's 64 or 96, and activates second rx buffer 618 to send data from second rx buffer 618 to first bus 113. Receive control unit 615 sends control signals to first and second rx buffers 616 and 618 to send data from first rx buffer 616 to second rx buffer 618. Receive control unit 615 has a field 6502 for storing z 555. Preferably, first and second rx buffers 616 and 618 can operative independently.

Conveniently, enable unit 64 does not check the content of first portions 6211–6281 and 681 of queue 62 and bypass register 682 accordingly. The content of fields 6502 and 6102 of receive and transmit 615 and 610 unit is compared to the content of first portions 6211–6281 and 628, and if there is no match, the content of fields 6502 and 6102 is sent to enable unit 64.

Figure 6:
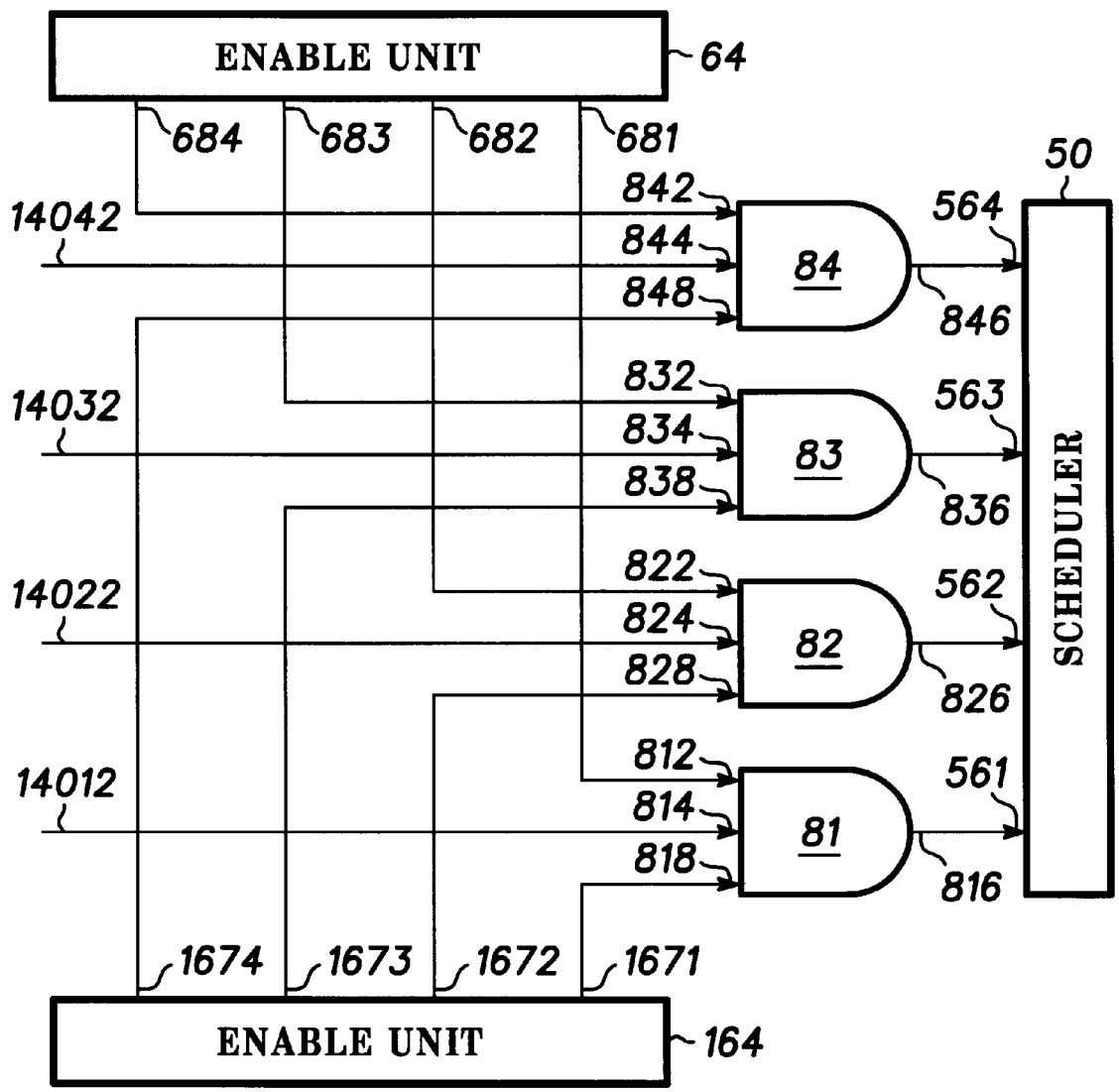
FIG. 6 is a schematic description of an enable unit, a scheduler and a masking logic, according to an embodiment of the invention.

FIG. 6 is a schematic description of enable unit 64, scheduler 50 and masking logic 80. Masking logic comprises of a plurality of AND logic gates. For convenience of explanation, this description relates to four 3-input logic AND gates 81–84 out of plurality of AND logic gates (i.e.—gates). First gate 81 has inputs 812, 814 and 818 and output 816. Second gate 82 has inputs 822, 824 and 828 and output 826. Third gate 83 has inputs 832, 834 and 838 and output 836. Fourth gate 84 has inputs 842, 844 and 848 and output 846.

Output 671 of enable unit 64 is coupled to input 812 of first gate 81. Output 672 of enable unit 64 is coupled to input 822 of second gate 82. Output 673 of enable unit 64 is coupled to input 832 of gate 83. Output 674 of enable unit 64 is coupled to input 842 of fourth gate 84. Output 1671 of enable unit 164 is coupled to input 818 of first gate 81. Output 1672 of enable unit 164 is coupled to input 828 of second gate 82. Output 1673 of enable unit 164 is coupled to input 838 of gate 83. Output 1674 of enable unit 164 is coupled to input 848 of fourth gate 84. Output 846 of fourth gate 84 is coupled to input 564 of scheduler 50. Output 836 of third gate 83 is coupled to input 563 of scheduler 50. Output 826 of second gate 82 is coupled to input 562 of scheduler 50. Output 816 of first gate 81 is coupled to input 561 of scheduler 50. Input 844 of fourth gate 84 is coupled to line 14012, for receiving a receive or transmit request from a request channel. Input 834 of third gate 83 is coupled to line 14022, for receiving a receive or transmit request from another request channel. Input 824 of second gate 82 is coupled to line 14032, for receiving a receive or transmit request from a request channel. Input 814 of first gate 81 is coupled to line 14042, for receiving a receive or transmit request from a request channel.

When first DMA 60 or second DMA 160 receive a DMA request related to a receive channel, it sends a disable signal (low level signal) to the gate which receives the receive or transmit request from that request channel, the enable signal masks the request coming from that channel. When first DMA 60 or second DMA have no requests relating to a request channel they send an enable signal to the gate coupled to the request channel. If both first and second DMA 60 and 160 send a enable signal, the receive or transmit request of the request channel can reach scheduler 50.

For example, first gate 81 is coupled to first request channel RZ(1). First request channel sends a transmit request (high level signal) via line 14042. There are no DMA requests related to first request channel RZ(1) either if first or second DMA 60 and 160. Both first and second DMA 60 and 160 sends a high level signal to inputs 812 and 818 of first gate 81. Scheduler 50 receives the transmit request from first request channel RZ(1), via input 561, and causes first processor 90 to start executing first task T(1) for handling the transmit request. When first task T(1) requires a DMA request, first processor 90 sends a DMA request to either first or second DMA 60 or 160. For convenience of explanation it is assumed that first processor 90 sends the DMA request to first DMA 60. Until first DMA 60 does not finish to perform the DMA request, enable unit 64 sends a low level signal to input 812 of first gate 81, forcing the output signal of first gate to be low, thus masking the transmit request of the first request channel RZ(1).

The disable signal can further come from first processor 90. The disable signal is sent when first processor 90 sends a DMA request. First processor 90 and enable unit 64 are coupled to a flip-flop, while first processor is coupled to the reset input of the flip-flop, while enable unit 64 is coupled to the set input of the flip-flop. The output of the flip-flop is coupled to an input of an AND logic gate, as described above. First processor is also coupled to enable unit 164 of second DMA 160.

Figure 7:
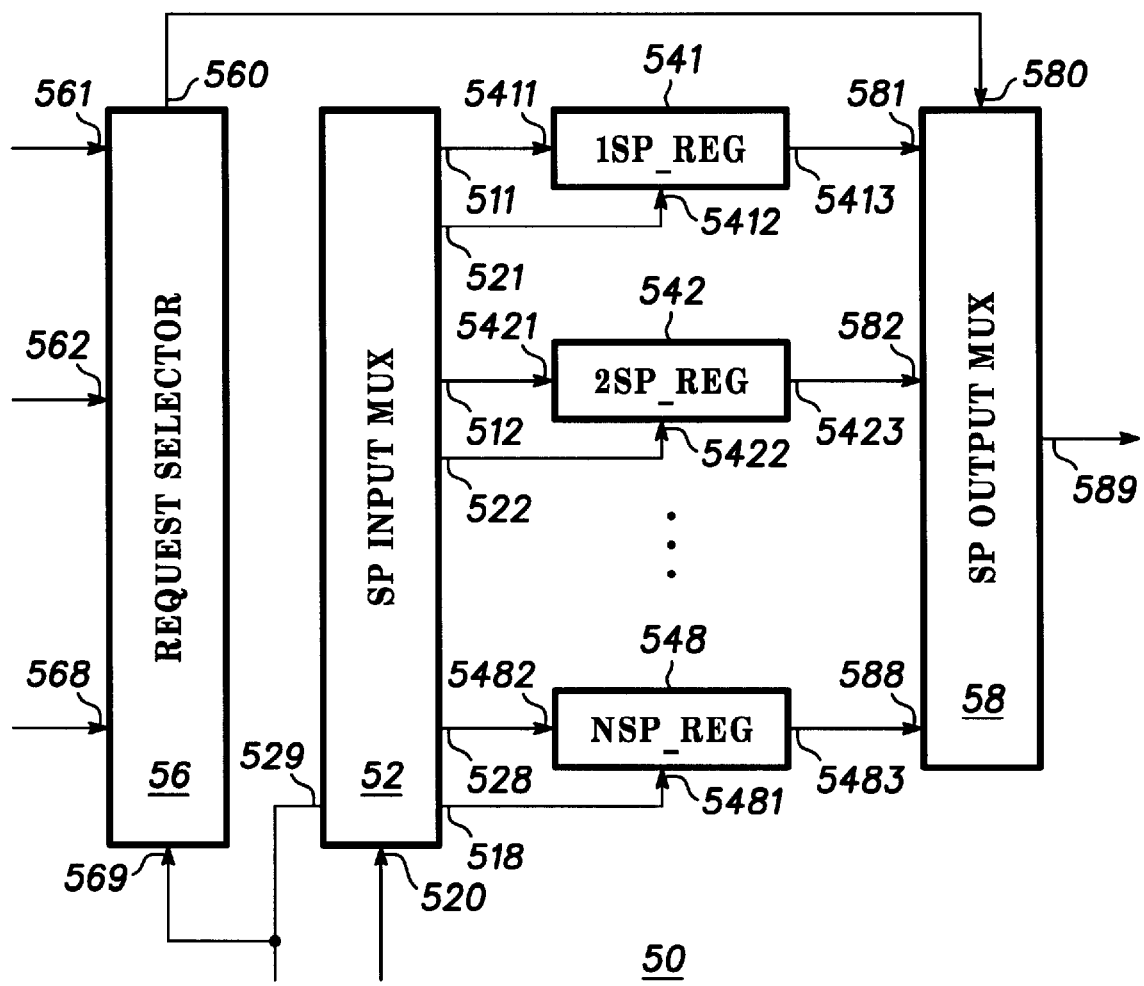
FIG. 7 is a schematic description of a scheduler according to a preferred embodiment of the invention.

FIG. 7 is a schematic description of scheduler 50, according to a preferred embodiment of the invention. Scheduler 50 is comprised of a request selector 56, a stack pointer input multiplexer (i.e.—sp input mux) 52, a stack pointer output multiplexer (i.e.—sp output mux) 58, and 2M stack pointer registers 1sp_reg–2Msp_reg 541–548, collectively denoted as 540.

Scheduler 50 stores a set of up to 2M stack pointers. A stack pointer is the address of an instruction I(z,r) which is a part of a task T(z), z and r being integers, z having values of 1 to 2M. Preferably, a task T(z) is dedicated to a single receive or transmit request from a request channel RC(z). A task T(z) can be stored within instruction memory bank 130, within first memory bank 70 or within external memory bank 110. A task T(z), or a part of it can also be stored in other memory banks.

For example, if the selected transmit or receive request is associated to RC(c), it causes first processor 90 to fetch a stack pointer from Dsp reg. The content of Csp_reg is the address of instruction I(c,r). First processor 90 then executes a part of task T(c).

Figure 13:
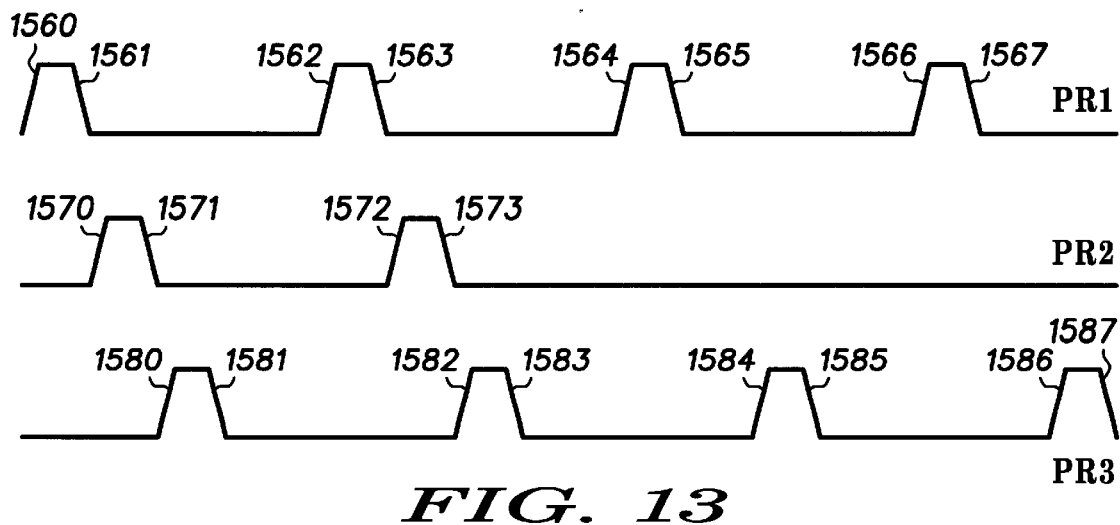
FIG. 13 is a time diagram illustrating the response of the first processor to various receive/transmit requests, according to a preferred embodiment of the invention.

Usually, and as explained in further details with accordance to FIG. 13, first processor 90 executes some instructions (I(z,r)–I(z,r+d), d being an integer) of the z'th task T(z) until there is a need to fetch information from an external unit. First processor 90 sends a DMA request, associated with RC(z), to first DMA 60 or to second DMA 160, and sends an updated stack pointer (pointing to instruction I(z,r+d+1), which follows instruction I(z,r+d). Conveniently, if task T(z) is finished, I(z,1) is sent to Zsp reg) to Zsp_reg, and waits to receive a new selected stack pointer from scheduler 50. When scheduler sends first processor 90 a new selected stack pointer, associated with the x'th task T(x), first processor 90 starts, to execute instructions out of task T(x).

A "task switch" is defined as the process being done by first processor 90, of stopping the execution of a task, waiting to receive a selected task and starting to execute instructions out of the selected task. Usually, the selected task differs from the task which was stopped, but it is not necessarily.

Request selector 56 has 2M inputs 561–568, a control input 569 and output 560. Sp input mux 52 has inputs 520 and 529, a first set of 2M outputs 511–518 and a second set of 2M outputs 521–528. Stack pointer registers (i.e.—sp registers) 541–548 have a first set of inputs 5411–5481, a second set of inputs 5412–5482 and outputs 5413–5483. Sp output mux 58 has 2M inputs 581–588, input 580 and output 589. Output 560 of request selector 56 is coupled to input 580 of sp output mux 58, for selecting which input out of 2M inputs 581–588, is coupled to output 589. Inputs 561–568 of request selector are coupled to 2M request channels RC(1)–RC(2M) collectively denoted 150. Output 648 sends enable signals to receive channels, as explained in further details in accordance FIG. 4. Conveniently, 2M AND logic gates (not shown), each having two inputs and an output are coupled to the 2M bit output 648 of enable unit 64 and to the 2M receive and transmit channels from one side, and to 2M inputs 561–568 from the other.

Transmit requests are usually sent when a request channel finishes to send data to a communication channel, and the request channel can receive a new data. Receive requests are usually sent when a request channel receives data.

Request selector 56 checks whether it received a transmit or receive request from one or more request channels. If the answer is 'YES' request selector 56 selects the request which has the highest priority. For convenience of explanation, it is assumed that the request which has the highest priority came from the z'th request channel RC(z). Request selector 56 sends a control signal to, Sp input mux 52, causing the z'th stack pointer, stored within Gsp_reg, to be sent to first processor 90. First processor 90 fetches from instruction memory bank 130 the instruction I(z,r) which is pointed by the z'th stack pointer, and starts to execute it and the following instructions of task T(z).

The priority of the requests can be fixed or can be changed. For example—a request which is inputted through the first input 561 can have the lowest priority and the request which is inputted through the M'th input 568 can have highest priority.

FIG. 8 is a schematic description of a Block Transfer Machine (i.e.—BTM) 40, according to a preferred embodiment of the invention. BTM 40 comprising of: BTM data register (i.e.—bdata buffer) 41, BTM control unit (i.e.—bcontrol unit) 46, data manipulator 44 and CRC machine 48. BTM 40 is coupled to CRC REG. 42, to first memory bank 70 and to peripherals 140. CRC REG 42 is one of the registers of first processor 90.

Conveniently, BTM 40 handles data transfers from (to) peripherals 140 to (from) first memory bank 70. Usually, first processor 90 sends BTM 40 a transfer request, indicating the source and the destination of the data being transferred, and the data length. For example, if BTM 40 is coupled to a peripheral and to first memory bank 70 by a 32 bit bus, and there is a need to transfer 8×32=256 bits, then first processor 70 will send a transfer instruction having a length field of 8, indicating that 8 32-bit transfers are to be executed. Usually ATM communication protocol requires the transfer of larger data blocks, such as 48×32 =1536 bits. Conveniently, BTM 40 can comprise of a DMA controller alone. Preferably, DMA 40 handles the transfer of data and can also process the data it transfers. Each peripheral 1401–1408 has an I/O 1421–1428.

Bdata buffer 41 has input 414, I/O's 412 and 416. CRC REG 41 has input 424 and I/O 426. BRAM 43 has I/O 432 and input 434. Data manipulator 44 has inputs 442 and 444 and I/O 446. Bcontrol unit 46 has input 462 and output 464. CRC machine 48 has inputs 484 and 482 and I/O 486.

Peripheral bus 112 is coupled, via I/O 43 of BTM 40, to I/O 442 of data manipulator 44 and to input 482 of CRC machine 48. Output 464 of bcontrol unit 46 is coupled, via I/O 46 of BTM 40, to input 424 of CRC REG. 42, to input 484 of CRC machine 48, to input 444 of data manipulator 44, to input 344 of BRAM 43, and to input 414 of bdata buffer 41. Input 462 of bcontrol unit 46 is coupled, via I/O 47 of BTM to I/O 97 of first processor 90. I/O 426 of CRC REG. 42 is coupled, via I/O 47 of BTM 40, to I/O 486 of CRC machine 48. I/O 446 of data manipulator 44 is coupled to I/O 412 of bdata buffer 41. I/O 416 of bdata buffer 41 is coupled, via I/O 45, to I/O 72 of first memory bank 70.

Bcontrol unit 46 is activated by control signals and/or instruction operands sent from output 97 of first processor 90. Bcontrol unit 46 controls the operation of BTM 40 by sending control signals, via output 464, to CRC reg. 42, CRC machine 48, data manipulator 44 and bdata buffer 41. Bcontrol unit 46 sends control signals which cause data to flow from (to) peripheral bus 112, to (from) first memory bank 70. Bcontrol unit can cause the CRC machine to do a CRC check on the data, and store the result at CRC REG. 42. Conveniently, CRC machine 48 does a CRC check during a single clock cycle. Preferably, CRC machine can make a CRC check on a data word of 16 bits during a single clock cycle. Data manipulator 44 can read a data word, via I/O 442 and can swap the data word, or create a shifted data word, and send a new data word via I/O 446 to I/O 412 of bdata buffer 41. Bdata buffer 41 stores the new data word and sends it to bram 43. Bdata buffer 41 can also receive a data word from bram 43, and send it to data manipulator 44. Data manipulator 44 can swap the data word, or create a shifted data word, and send a new data word via I/O 442 to peripheral bus 112.

Figure 9:
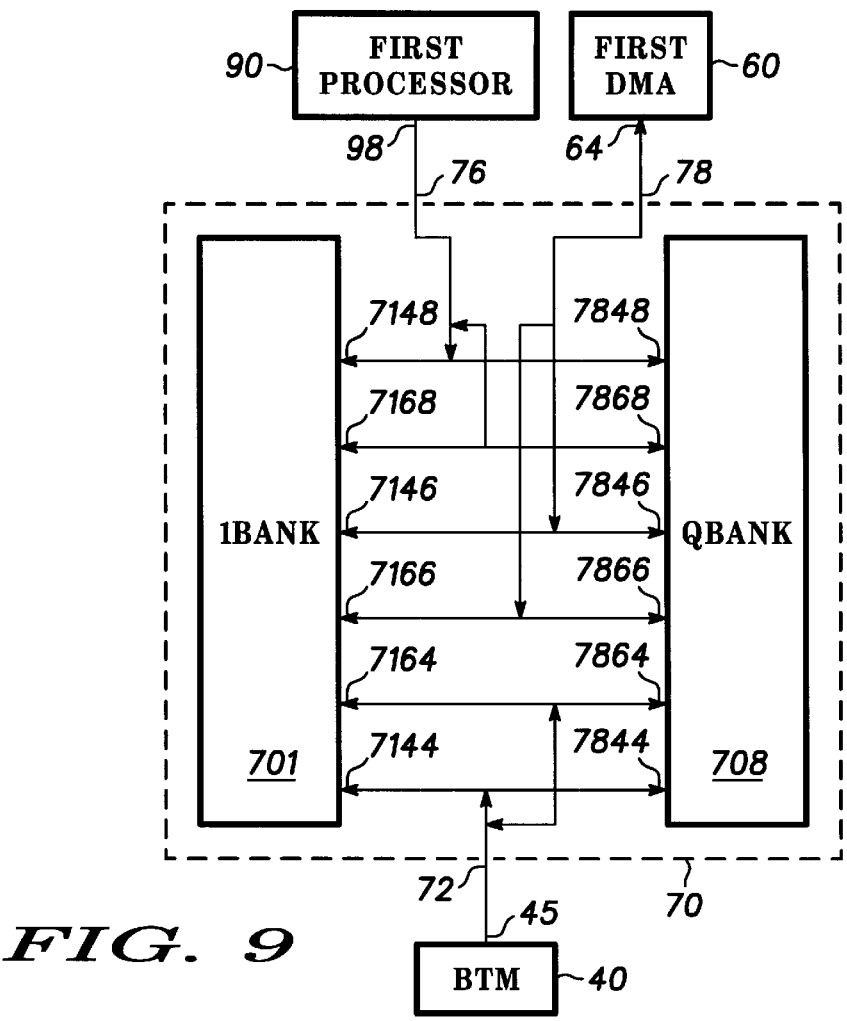
FIG. 9 is a schematic description of a first memory bank, according to preferred embodiment of the invention.

FIG. 9 is a schematic description of first memory bank 70, according to preferred embodiment of the invention. Memory bank 70 conveniently is comprised of Q sections (i.e.—memory banks) 1BANK–QBANK 701–708. Each memory bank of 1BANK–QBANK 701–708 is coupled first processor 90, first DMA 60 second DMA 160 and to BTM 40. For convenience of explanation, just two memory banks 1BANK 701 and QBANK 708 are drawn, but any number Q of memory banks can be implemented. For convenience of explanation second DMA 160 is not drawn.

I/O 98 of first processor 90 is coupled, via I/O 78 of first memory bank 70, to input 7148 of 1BANK 701, to input 7848 of QBANK 708, to I/O 7168 of 1BANK 701 and to I/O 7868 of QBANK 708. I/O 64 of first DMA 60 is coupled, via I/O 78 of first memory bank 70, to input 7148 of 1BANK 701, to input 7848 of QBANK 708, to I/O 7166 of 1BANK 701 and to I/O 7866 of QBANK 708. I/O 45 of BTM 40 is coupled, via I/O 72 of first memory bank 70, to input 7144 of 1BANK 701, to input 7844 of QBANK 708, to I/O 7164 of 1BANK 701 and to I/O 7864 of QBANK 708. As explained in further details in accordance to FIG. 8, if a memory bank (for example 1BANK 701) is simultaneously accessed by more then one elements out of First processor 90, first DMA 60 and BTM 40, 1BANK 701 decides which element is served first and which is served after the first elements is served.

FIG. 10 is a schematic description of memory bank 1BANK 701 of the Q memory banks within first memory bank 70, according to preferred embodiment of the invention. 1BANK 701 comprises of memory array 718, data multiplexer (i.e. DATA MUX) 716, address multiplexer (i.e.—ADDRESS MUX) 714 and memory selector 712. DATA MUX 716 has input 7163, and I/O's 7164, 7166, 7168 and 7169. ADDRESS MUX 714 has inputs 7144, 7146, 7148 and 7149 and output 7142. Memory selector 712 has inputs 7124, 7126 and 7128, and outputs 7123 and 7125. Memory array 718 has input 7182 and I/O 7184. Input 7163 of DATA MUX 716 is coupled to output 7123 of memory selector 712. Input 7149 of ADDRESS MUX 714 is coupled to output 7125 of memory selector 712. Output 7142 of ADDRESS MUX 714 is coupled to input 7182 of memory array 718. I/O 7169 of DATA MUX 716 is coupled to I/O 7184 of memory array 718.

BTM 40, first DMA 60, second DMA 160 and first processor 90 can send an address word, to inputs 7144, 7146 and 7148 of ADDRESS MUX 714 accordingly and to inputs 7124, 7126 and 7128 of memory selector 712 accordingly. Some of the address word bits are sent to memory selector 712 and the remaining bits are sent to ADDRESS MUX 714. The address bits which are sent to memory selector 712 are used to select one memory bank out of 1BANK–QBANK 701–708.

If just one elements out of first processor 90, first DMA 60 and BTM 40 sends an address word, this element is selected—memory selector sends 712 a select signal, from outputs 7125 and 7163 to inputs 7149 of ADDRESS MUX 714 and to input 7163 of DATA MUX 716 accordingly. The select signal causes ADDRESS MUX 714 to send the remaining bits of the address word sent from the selected element to input 7182 of memory array 718. The select signal causes DATA MUX 716 to couple I/O 7184 of memory array 718 to the I/O of the selected element. For example, when BTM 40 writes a data word to BANK 1 it sends an address word to BANK1 701 and sends a data word to I/O 7164 of DATA MUX 716. Memory selector 712 receives some of bits of the address word and identifies that BTM 40 writes (reads) a data word to (from) 1BANK 701. Memory selector 712 sends a select signal to DATA MUX 716 which couples I/O 7164 (and eventually I/O 42 of BTM 40) to output 7169 of DATA MUX 716, and accordingly to I/O 7184 of memory array 718.

If more than element out of BTM 40, first DMA 60 and first processor 90, sends a data address to 1BANK, memory selector 712 selects the request coming from the element with the highest priority and sends a select signal to DATA MUX 716 and to ADDRESS MUX 714 accordingly. For example, if BTM 40 and first processor 90 sends simultaneously, address words to 1BANK, and first processor 90 has a higher priority than BTM 40, memory selector sends a select signals which cause input 7148 of ADDRESS MUX 714 to be coupled to input 7182 of memory array 718, and to I/O 7168 of DATA MUX 716 to be coupled to I/O 7184 of memory array 718.

Some of memory banks BANK–QBANK can be interleaved to provide high rates for sequential access. This interleaving provides that a first memory word is found in a first data bank, the second memory word is found in the second memory bank. The interleaving is performed by swapping the least significant bits and the most significant bits of the address word. For example, if first memory bank is comprised of 16 memory banks, each of 2K words, then the address word has to be 15 bits long—four bits are used to select one of the 16 memory banks, and the other 11 bits define which data word within a 2 k word memory bank is selected. Interleaving can be done by sending the four least significant bits of an 15-bit address word to the 4 most significant bits of the address bus of each memory selector 712, and the remaining 11 bits are sent to ADDRESS MUX 714.

Figure 11:
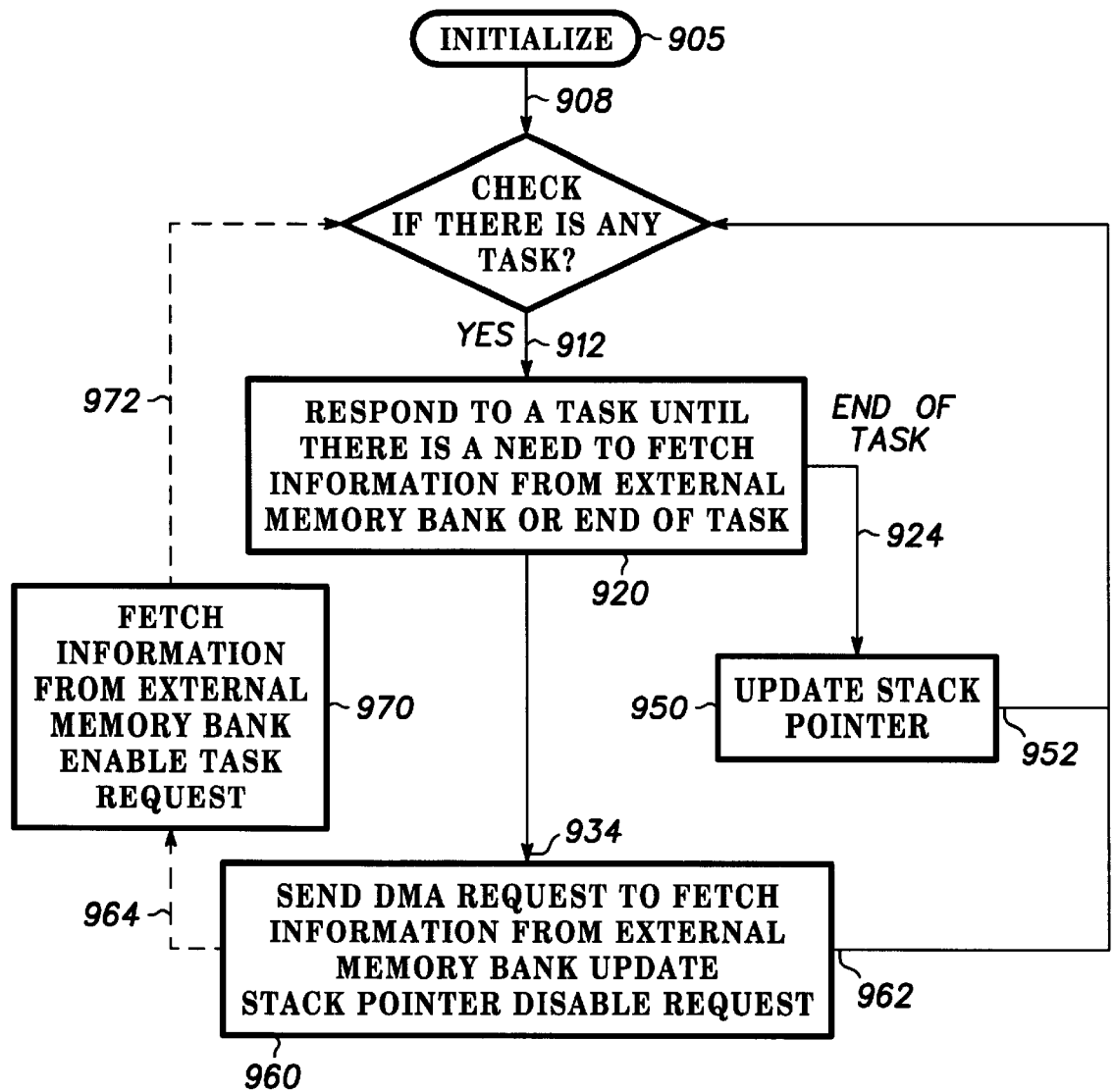
FIG. 11 is a flow chart illustrating a preferred embodiment of a method for executing tasks and performing task switches according to a preferred embodiment of the present invention.

FIG. 11 is a flow chart illustrating a preferred embodiment of the method 900 for executing tasks and performing task switches according to a preferred embodiment of the present invention.

Method 900 begins at step 910 where scheduler 50 checks if it received one or more receive or transmit request from any request channel. Step 910 is followed by step 920, as indicated by path 913.

During step 920 scheduler 50 selects the receive/transmit request having the highest priority. For convenience of explanation, it is assumed that the request came from CR(z). Scheduler 50 sends a stack pointer which is associated with the selected receive/transmit request, causing first processor 90 to execute task T(z), associated with CR(x). The execution of task T(z) usually involves fetching data, status words, request channel parameters, communication channel parameters and pointers (i.e.—information). During step 920 first processor 90 executed task T(z) until task T(z) ends or until there is a need to fetch information from external memory bank 110 or from external unit.

As indicated by path 934, and step 962, if there is a need to fetch information which is stored in external memory bank 110, first processor sends a DMA request to first DMA 60, stores an updated stack pointer SP(z) in the z'th stack pointer register (i.e.—Zsp_reg) of scheduler 50, and sends a disable signal to scheduler 50, which masks any transmit or receive request from RC(z). As indicated by path 962, step 960 is followed by step 910.

As indicated by path 964, after a DMA request is sent, first DMA 60 or second DMA 160 executes the request and fetches the information, during step 970. After the information is fetched, first DMA 60 or second DMA 160 accordingly, sends an enable signal to the scheduler 50, to unmask any receive or transmit requests from T(z). Step 970 can be executed while steps 910, 920, 930, 940, 950, and 960 are executed in accordance to task T(x).

As indicated by dotted path 972, step 972 is followed by step 910, meaning that after information relating to task T(z) is fetched, task T(z) can be executed from step 910. As explained in further details in accordance to FIG. 4, T(z) is comprised of a set of instructions, whereas first processor can execute some of these instructions (I(z,r)–I(z,r+d)), and perform a task switch. When first processor 90 responds to a request coming from RC(z), it will fetch the next instructions, starting with I(z,r+d+1), which follows instruction I(z,r+d).

As indicated by path 924 and 952 and step 950, if the task T(z) ends, first processor 90 sends an updated stack pointer to Zsp_reg and method 900 commences to step 910 for checking if the scheduler 50 has received any transmit/receive request.

At the beginning of step 960 first processor 90 sends a DMA request to first DMA 60 or second DMA 160, in order to fetch the information associated to task T(z), and sends a disable signal to scheduler 50, which masks any transmit or receive request from CR(z). First processor 90 sends Zsp_reg its current stack pointer. The disable signal can also be sent by first DMA 60 or second DMA 160.

Figure 12:
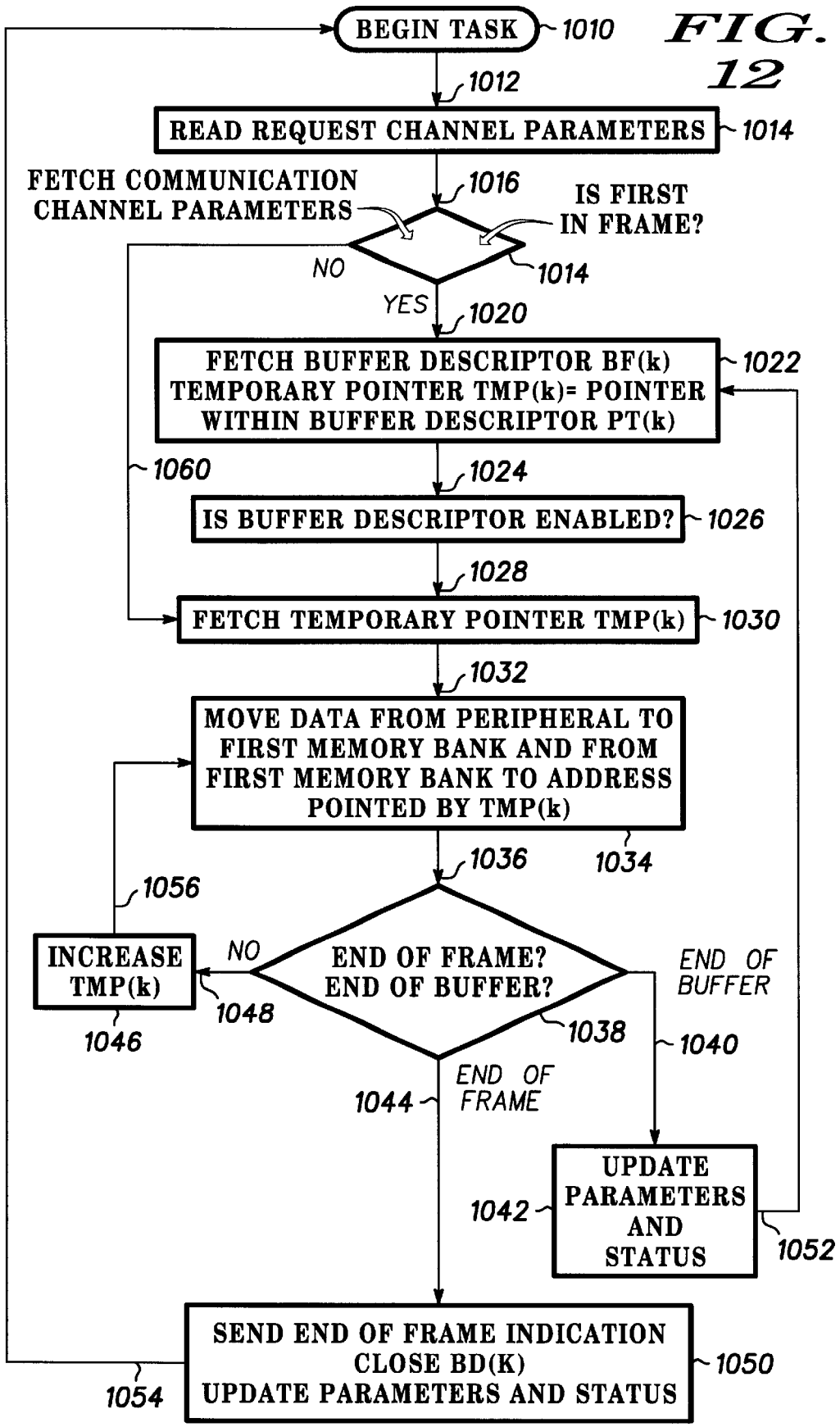
FIG. 12 is a flow chart illustrating a preferred embodiment of a method for executing a task initiated by a receive or transmit request, according to a preferred embodiment of the present invention.

FIG. 12 is a flow chart illustrating a preferred embodiment of the method 1000 for executing a task initiated by a receive or transmit request, according to a preferred embodiment of the present invention.

Steps 1014, 1018, 1022, 1030 involve fetching information. If the information is stored at external memory bank 110 or any other external unit, first processor 90 executes a task switch, as explained in accordance to FIG. 9. Step 1046 can be followed by a task switch. For example, if a request peripheral does not store a whole frame but a portion of that frame and first processor 90 ends to process that portion, there is a need to fetch the remaining portions of that frame, thus first processor 90 performs a task switch and can return to perform this task when another portion of the frame is stored in the peripheral. For convenience of explanation, these task switches are not shown in FIG. 10, and method 1000 is illustrated as being executed without task switches.

During step 1010 first processor 90 starts to execute instruction from a selected task T(z), by fetching first instruction I(z,1) of T(z).

As indicated by path 1012, step 1010 is followed by step 1014. During step 1014 first processor 90 fetches and reads the request channel parameters of the selected channel RC(z).

For example, and without limiting the scope of the invention, the channel parameters can comprise of PD(k). When receiving data streams sent according to ATM communication protocol, first processor 90 can read the cell's header. The header contains an address, which is associated to a virtual connection (i.e.—CV). The address defines the channel which its channel parameters are to be read during step 1018. While receiving a data stream according to Fast Ethernet communication protocol, first processor 90 checks if there were collisions, if the collision appeared in a predetermined time window, if the answer is "YES" communication controller 111 ignores the received information, or retransmits the data steam, when first processor executes a task which involves transmitting data to RC(z). If the answer is "NO", first processor 90 sends an error signal to second processor 100.

As indicated by path 1016, step 1014 is followed by step 1018. During step 1018, first processor fetches the communication channel parameters. First processor 90 checks if the data word to be received (or transmitted) by communication controller 111, is the first data word in a communication frame. If the answer is yes step 1018 is followed by step 1022, else it is followed by step 1030. Usually, the communication channel parameters comprise of a field which indicates whether a data word is the first in a frame. For example, when receiving cells according to an ATM communication protocol, this indication can be found in the cell's header.

As indicated by path 1020 step 1018 is followed by step 1022. During step 1022, first processor 90 fetches BF(k), according to DP(k), which was fetched previously. TMP(k) gets the value of PT(k), because first processor 90 will start to write data words received from CC(k) to the beginning of BF(k).

As indicated by path 1024 step 1022 is followed by step 1026. During step 1026 first processor reads FSB(k). If the bit is set first processor 90 can not access BF(k). Conveniently, first processor 90 will wait until second processor 100 resets FSB(k), and not try to write data to other buffer descriptors, but this is not necessary. As indicated by path 1028, when FSB(k) is reset, first processor fetches TMP(k) during step 1030. TMP(k) point to the address in which the received data word is going to be stored (or the address of data word to be transmitted).

As indicated by path 1032 step 1030 is followed by step 1034. If step 1034 is executed while communication controller 111 receives data from CC(k), via a peripheral, a data word (or data words) is (are) sent from CC(k) to first memory bank 70, and then sent from first memory bank 70 to the address pointed by TMP(k). If step 1034 is executed while communication controller 111 transmits data to CC(k), via a peripheral, a data word (or data words) is sent from the address pointed by TMP(k) to first memory bank 70 and then from first memory bank 70 is sent to CC(k). As explained in accordance to FIG. 8, BTM 40 handles the transmission of data from (to) CC(k) to (from) first memory bank 70.

As indicated by path 1036 step 1034 is followed by query step 1038.

During query step first processor 90 checks whether the data word/words which was/were stored in BF(k) (sent from BF(k)) during step 1034 were the last data word in a frame and whether BF(k) is full (empty).

As indicated by path 1048, if the answer to both questions is "no" then step 1038 is followed by step 1046. During step 1046, TMP(k) is increased, so that it points to the empty data word within BF(k) (to the next data word to be transmitted to CC(k)), which follows the memory word pointed previously by TMP(k). As indicated by path 1056 step 1046 is followed by step 1034.

As indicated by path 1044, if the data word is the end of a frame, regardless the status of BF(k), then query step 1038 is followed by step 1050. During step 1050 first processor 90 sends an end of frame indication to second processor 100, closed BD(k) by setting FSB(k), and updates the communication channel parameters. This update can include replacing DP(k) by the following descriptor pointer DP(k+1).

For example, is receiving a data stream according to ATM AL5 communication protocol (a subset of ATM communication protocol), first processor 90 has to check whether the CRC check indicated that there was a error during the transmission of the frame and if so it sends second processor an interrupt. First processor 90 can also check the length of the last cell, and update LW(k) accordingly.

As indicated by path 1040, if the BF(k) is full (empty, when transmitted data words from communication controller 111), step 1038 is followed by step 1042. During step 1042 first processor 90 closes BD(k) by setting FSB(k), and updating the communication channel parameters. This update can include replacing DP(k) by the following descriptor pointer DP(k+1).

FIG. 13 is a time diagram illustrating the response of the first processor to various receive/transmit requests, according to a preferred embodiment of the invention.

Signal PR1 represents the execution of first task T(1) by first processor 90. Signal PR2 represents the execution of second task T(2) by first processor 90 and signal PR3 represents the execution of third task T(3) by first processor 90. First task T(1) has higher priority than the second task T(2), and third task T(3) has a lower priority than second task T(2).

As indicated by transitions 1550 and 1551 first processor 90 starts to execute first task T(1) until first task T(1) requires fetching information from external memory bank 110. First task T(1) is executed before second and third tasks T(2) and T(3) because of his higher priority. As indicated by transition 1551, first processor 90 sends a DMA request to first DMA 60 and performs a task switch. First processor 90 stops executing first task T(1), and starts to execute task T(2), as indicated by transitions 1551 and 1560. The DMA request is performed prior to transition 1562, otherwise any request from the request channel associated to first task T(1), is disabled, and first processor will not execute task T(1).

After transition 1561, first processor 90 starts to execute second task T(2), at the same manner it executed first task T(1). Second task T(2) is executed until there is a need to fetch information from external memory bank 110, as indicated by transitions 1560 and 1561. A indicated by transitions 1561 and 1570, first processor 90 then performs a task switch—it stops to execute second task T(2) and starts to execute third task T(3), at the same manner it executed first and second tasks T(1) and T(2). As indicated by transition 1580 and 1581, third task T(3) is executed until there is a need to fetch information from external memory bank 110. After transition 1581 first processor checks if there are any requests, and because all receive/transmit requests are disabled, first processor 90 waits until the DMA request associated to first task T(1) is finished, and then continues to execute the first task, as indicated by path 1562.

First task T(1) is executed between transitions 1560 and 1561, transitions 1562 and 1563, transitions 1564 and 1565 and transitions 1566 and 1567. Between transitions 1561 and 1562, 1563 and 1564 and 1565 and 1566, first DMA 60 executed DMA requests associated to first task T(1). Second task T(2) is performed between transitions 1570 and 1571 and transitions 1572 and 1573. Between transitions 1571 and 1572 first DMA 60 or second DMA 160 executed DMA requests associated to second task T(2). Third task T(3) is executed between transitions 1580 and 1581, transitions 1582 and 1583, transitions 1584 and 15815 and 1586 and 1587. Between transitions 1581 and 1582, transitions 1583 and 1584 and transitions 1585 and 1586, first DMA 60 executed DMA requests associated to third task T(3).

Figure 14:
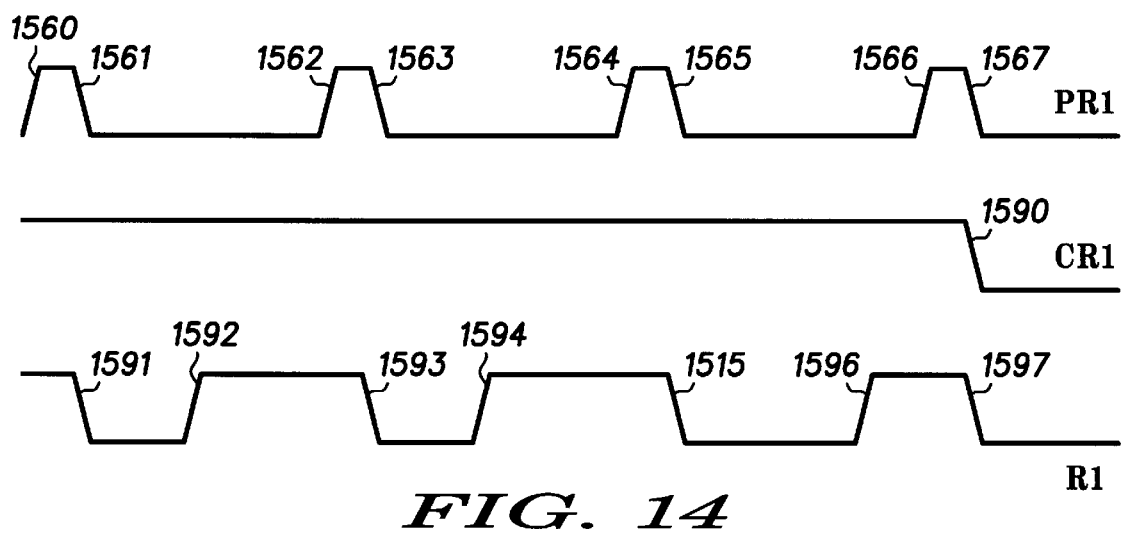
FIG. 14 is a time diagram illustrating the response of the first processor to various receive/transmit requests, according to a preferred embodiment of the invention.

FIG. 14 is a time diagram illustrating the response of the first processor to various receive/transmit requests, according to a preferred embodiment of the invention.

As explained in further details in accordance to FIG. 11, signal PR1 represents the execution of first task T(1) by first processor 90. First processor executes first task T(1) between transitions 1560 and 1561, 1562 and 1563, 1564 and 1565, 1566 and 1567. Transitions 1561, 1563 and 1565 indicate a task switch which is usually caused by need to fetch information from external memory bank, or other external unit.

Signal CR1 represents a receive/transmit request sent from CR(z). As indicated by transition 1590, the request is active until first processor 90 finishes to execute first task T(1).

Signal R1 represents the masked signal which is inputted to scheduler 50. As indicated by transition 1591, when first task T(1) requires fetching information from external memory bank 110, first processor 90 sends a DMA request to first DMA 60 or to second DMA 160, and sends a disable signal to scheduler 50. The disable signal resets signal R1. As explained in further detail in accordance to FIG. 4, after first DMA 60 or second DMA 160 accordingly executes all the DMA request resulting from RC(z), it sends a enable signal to scheduler 50. The enable signal sets signal R1, as indicated by transition 1592. Transition 1592 is a prerequisite to transition 1562. As long as the DMA requests associated to RC(z) are not fully executed, first processor 90 will not handle first task T(1).

The DMA request is performed prior to transition 1562, otherwise any request from the request channel associated to first task T(1), is disabled, and first processor will not resume the execution of instructions out of task T(1).

As indicated by transitions 1592, 1594, and 1596, R1 signal is set after first DMA 60 finishes to execute DMA requests associated with RC(z). As indicated by transitions 1593 and 1595, signal R1 is reset when there is a need to execute a DMA request associated with RC(z).

As indicated by transition 1597, R1 is reset when first processor 90 finishes to execute first task T(1).

Thus, there has been described herein an embodiment including at least one preferred embodiment of an improved method and apparatus for grouping data processor instructions and embodiments of instruction systems. It will be apparent to those skilled in the art that the disclosed subject matter may be modified in numerous ways and may assume many embodiments other than the preferred form specifically set out and described above. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A high speed communication controller, for receiving, transmitting and processing high speed data streams, the data streams being comprised of frames, the communication controller being adapted to be coupled to a plurality of communication channels and to a first and a second external buses, the communication controller comprising:

a first processor for controlling data stream transactions, wherein the first processor controls a transaction of a frame by executing a task;

a second processor for handling high level management and communication protocol functions; and a scheduler, coupled to first processor, for sensing if there is a need to execute a task, and for selecting a selected task to be executed by the first processor, wherein the first processor stops to execute a task when the execution of the task involves fetching information from the external memory bank.

2. The communication controller of claim 1 further comprising:

an instruction memory bank, coupled to the first processor, for storing tasks;

a first memory bank, coupled to the first processor, for storing data to be processed by the first processor;

a first direct memory access controller, coupled to the first processor and to the first external bus, for fetching information stored within an external memory bank which is coupled to the first external bus;

a second direct memory access controller, coupled to the first processor and to the second external bus, for fetching information stored within an external memory bank which is coupled to the second external bus; and a plurality of peripherals, coupled to the scheduler and to the first memory bank, for buffering between the multiple communication channels and the first memory bank.

3. The communication controller of claim 2 wherein the scheduler stores a plurality of stack pointers;

wherein a stack pointer is associated with a task;

wherein the scheduler sends the first processor a selected stack pointer, the selected stack pointer is associated with the selected task;

wherein an execution of a task involves updating the selected stack pointer; and wherein the first processor sends the scheduler the updated selected stack pointer, when the first processor stops to execute the selected task.

4. The communication controller of claim 3 further comprising:

a peripheral; and a peripheral bus, coupled to the scheduler and to the peripheral.

5. The communication controller of claim 4 wherein a peripheral has two request channels;

wherein the first request channel handles the transmission of data sent from the communication controller to a communication channel;

wherein the second request channel handles the reception of data sent to the communication controller from a communication channel;

wherein the first request channel sends the scheduler a transmit request when the first request channel can receive data to be sent to the communication channel; and wherein the second request channel sends the scheduler a receive request when the second request channel received data from a communication channel.

6. The communication controller of claim 5 wherein the scheduler comprising:

a request selector, coupled to the peripherals, for receiving transmit request and receive requests, and selecting a selected request;

a plurality of stack pointer registers, for storing a plurality of stack pointers;

a stack pointer input multiplexer, coupled to the plurality of the stack pointer registers and to the first processor, for writing stack pointers to the plurality of stack pointer registers; and a stack pointer output multiplexer, coupled to the plurality of the stack pointer registers, to the first processor and to the request selector, for sending the selected stack pointer to the first processor.

7. The communication controller of claim 6 wherein the first direct memory access controller and the second direct memory access controller comprising:

a direct memory access request queue, coupled to the first processor, for storing a plurality of direct memory access requests; and an enable unit, coupled to the direct memory access request queue and to the scheduler, for masking transmit requests from first request channels associated with the direct memory access requests stored in the direct memory access memory controller, and for masking receive requests from second request channels associated with the direct memory access requests stored in the direct memory access memory controller.

8. The communication controller of claim 7 wherein the first direct memory access controller and the second direct memory access controller further comprising:

a request bypass register, for storing a direct memory access request;

an input multiplexer, for determining whether to store a direct memory access request within the direct memory access request queue or within the request bypass register; and an output multiplexer, coupled to the first memory bank, to the direct memory access request queue and to the bypass request register, for selecting the direct memory access request stored in the request bypass register, if the request bypass register stores a valid direct memory access request.

9. The communication controller of claim 8 wherein the direct memory access request queue has a plurality of memory words;

wherein each memory word has a first portion and a second portion;

wherein the second portion is for storing direct memory access requests; and wherein the first portion is for storing a label, the label indicating the request channel which is associated to the direct memory access requests stored within the second portion.

10. The communication controller of claim 7 wherein a transmit request from a first request channel is masked when the enable unit within one of first direct memory access controller and second direct memory access controller masks a transmit request from the first request channel; and wherein a receive request from a second request channel is masked when the enable unit within one of first direct memory access controller and second direct memory access controller masks a receive request from the second request channel.

11. The communication controller of claim 10 further having a block transfer machine, for transferring data from the peripherals to the first memory bank and from the first memory bank to the peripherals;

wherein the block transfer machine comprising:
    a bit field unit, coupled to the peripherals, for manipulating data;
    a CRC machine, coupled to the peripherals, for performing CRC checks;
    a BTM data register, coupled to the CRC machine, the data manipulator and the first memory bank, for storing data to be sent from the first memory bank to the peripherals and for storing data to be written to the first memory bank; and
    a BTM control unit, coupled to the CRC machine, to the data manipulator and the BTM data register, for controlling the block transfer machine.

12. The communication controller of claim 11 wherein the first memory bank has a plurality of sections, each section is coupled to the first processor, the second processor, the direct memory access controller, the second direct memory access controller and the BTM, wherein each section comprising:
    a memory array, for storing information;
    a memory selector, for selecting a selected device out of the first processor, the second processor, the direct memory access controller, the second direct memory access controller and the BTM;
    a data multiplexer, for enabling the transmission of data between the selected device and the memory array; and
    an address multiplexer, for enabling the selected device to send an address word to the memory array.

13. The communication controller of claim 5 wherein the external memory bank has a plurality of buffers, for storing data;
    wherein the external memory bank further has buffer descriptors, for storing a pointer, a status and control field and a length field;
    wherein the pointer points to a buffer;
    wherein the length field defines the length of the buffer that is referenced by the pointer; and
    wherein the status and control word has a F/S field, which indicates which one of the first processor and the second processor can access the buffer referenced by the pointer.

14. The communication controller of claim 13 wherein a buffer stores data associated with a request channel;
    wherein a set of buffers associated with a single request channel form a circular queue;
    wherein the status and control word comprises of a wrap field, for indicating whether the buffer referenced by field, the buffer descriptor having the wrap field, is the last buffer in the set;
    wherein a buffer stores data from a single data frame;
    wherein each buffer comprises of a plurality of memory words;
    wherein the first memory bank stores a temporary pointer; and
    wherein a temporary pointer points to the next memory word to be processed by the first processor.

15. The communication controller of claim 14 wherein the first processor sets the F/S field after the buffer referenced by the buffer descriptor is processed by the first processor; and
    wherein the second processor resets the F/S field after the buffer referenced by the buffer descriptor is processed by the second processor.

16. The communication controller of claim 14 wherein when the first processor performs a task switch it saves the updated temporary pointer in the first memory bank; and
    wherein when the first processor starts to execute instructions out of a task, the first processor fetches the temporary pointer.

17. A method for handling transactions of data streams, the data streams being comprised of frames, wherein a transaction of a frame is handled by the execution of a task, wherein executing a task involves fetching information from an external unit, the method comprises of the following steps:
    checking if there is a need to handle a transaction;
    executing a task, if there is a need to handle a transaction, until the task ends or until the execution of the task involves fetching information from an external unit;
    jumping to step of checking if there is a need to handle a transaction, if the task ended; and
    else, initiating a process of fetching the information from the external unit, stopping the execution of the task that involved fetching information from an external unit and jumping to step of checking if there is a need to handle a transaction.

18. The method of claim 17 wherein the execution of a task is stopped when there is a need to receive a portion of a frame from a communication channel.

19. A method for operating a communication controller for receiving, transmitting and processing high speed data streams, the data streams are comprised of frames, the communication controller coupled to a plurality of communication channels and to an external units, the communication controller having a first processor for controlling data stream transactions; wherein the first processor controls a transaction of a frame by executing a task; a second processor for handling high level management and communication protocol functions; a first external bus, coupled to the first processor and the second processor, for coupling the first processor and the second processor to external units; a second external bus, coupled to the first processor and the second processor, for coupling the first processor and the second processor to external units; and a scheduler, coupled to first processor, for sensing if there is a need to execute a task, and for selecting which task to execute; the method comprising of the following steps:
    checking if there is a need to handle a transaction;
    executing a task, if there is a need to handle a transaction, until the task ends or until the execution of the task involves fetching information from an external unit;
    jumping to step of checking if there is a need to handle a transaction, if the task ended; and else, initiating a process of fetching the information from the external unit, stopping the execution of the task that involved fetching information from an external unit and jumping to step of checking if there is a need to handle a transaction.

20. The method of claim 19 wherein the communication controller further has an instruction memory bank, coupled to the first processor, for storing tasks; a first memory bank, coupled to the first processor, for storing data to be processed by the first processor; a first direct memory access controller, coupled to the first processor and to the first external bus, for fetching information stored in an external memory bank coupled to the first external bus; a second direct memory access controller, coupled to the first processor and to the second external bus, for fetching information stored an external memory bank coupled to the second external bus; a plurality of peripherals, coupled to the scheduler, and to the first memory bank, for buffering between multiple communication channels and the first memory bank; wherein each peripheral is comprised of two request channels; wherein the first request channel handles the transmission of data sent from the communication controller to a communication channel; wherein the second request channel handles the reception of data sent to the communication controller from a communication channel; wherein request channel parameters define the status of a request channel; wherein communication channel parameters define the status of a communication channel; wherein the external memory bank has a plurality of buffers, for storing data; wherein the external memory bank further has buffer descriptors, for storing a pointer, a status and control field and a length field; wherein the pointer points to a buffer; the method comprising of the following steps:

starting a task;

reading request channel parameters;

fetching communication channel parameters and checking communication channel parameters which indicate whether the task involves processing the first data word in a frame;

if the task involves processing the first data word in a frame performing the following steps:
  fetching buffer descriptors;
  setting temporary pointer to the value of pointer within buffer descriptor;
  checking whether the buffer descriptor is enabled, wherein if the buffer descriptor is not enabled, waiting until buffer descriptor is enabled;
  fetching the temporary pointer;

else, jumping to step of fetching the temporary pointer;

moving data from a communication channel to an external unit, if receiving data and moving data from an external unit to a communication channel, if transmitting data;

checking if a data frame ended and if a buffer ended;

updating communication channel parameters and jumping to step of fetching buffer descriptor, if a buffer ended;

sending an end of frame indication, closing a buffer descriptor, updating communication channel parameters and jumping to step of starting a task, if a frame ended; and else, updating temporary pointer and jumping to step of moving data.

* * * * *